M. E. PETERS, G. H. FATH & A. F. MILLER.
BOX COVERING MACHINE.
APPLICATION FILED NOV. 5, 1915.
1,251,811.
Patented Jan. 1, 1918.
18 SHEETS—SHEET 14.
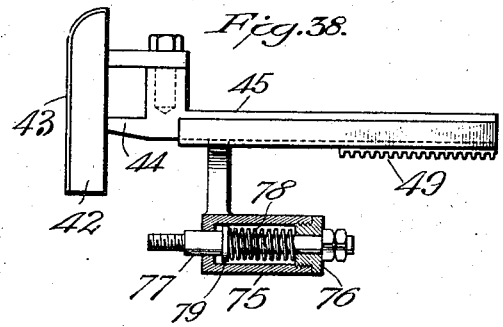
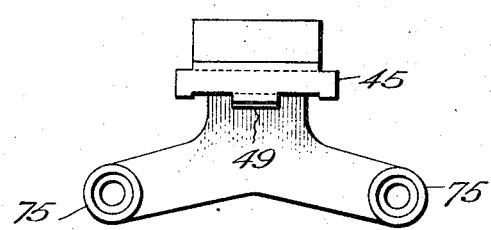
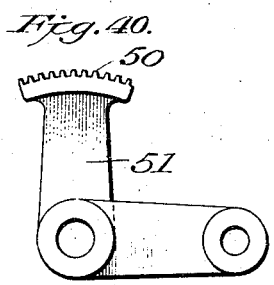
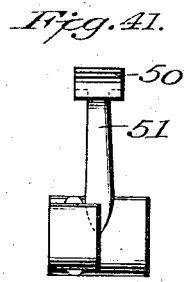
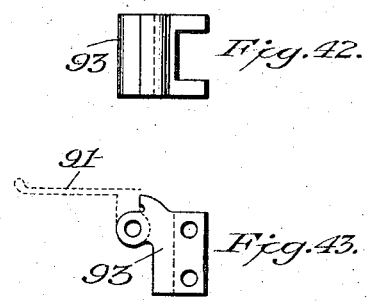
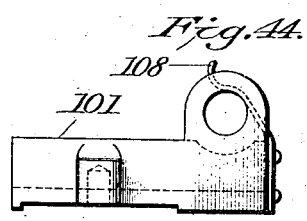
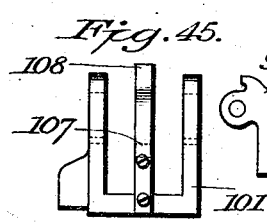
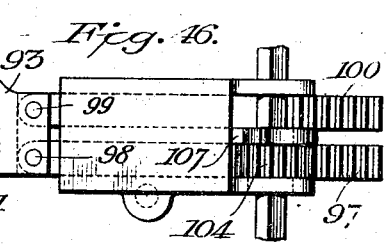
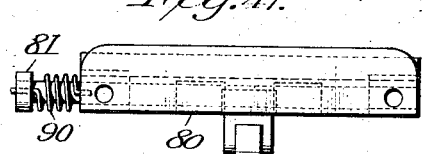
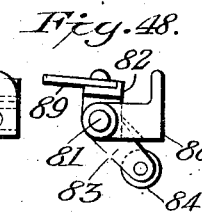
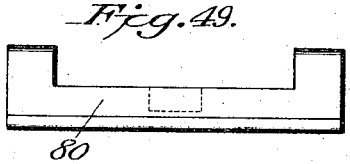
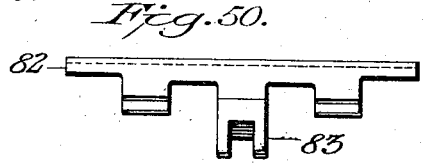
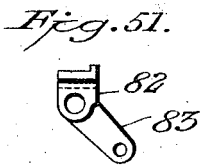
Witnesses:
G. Sargent Elliott
Adella M. Fowle
H. S. Bailey.
Inventors:
Melville E. Peters
George H. Fath
By Albert F. Miller
Attorney

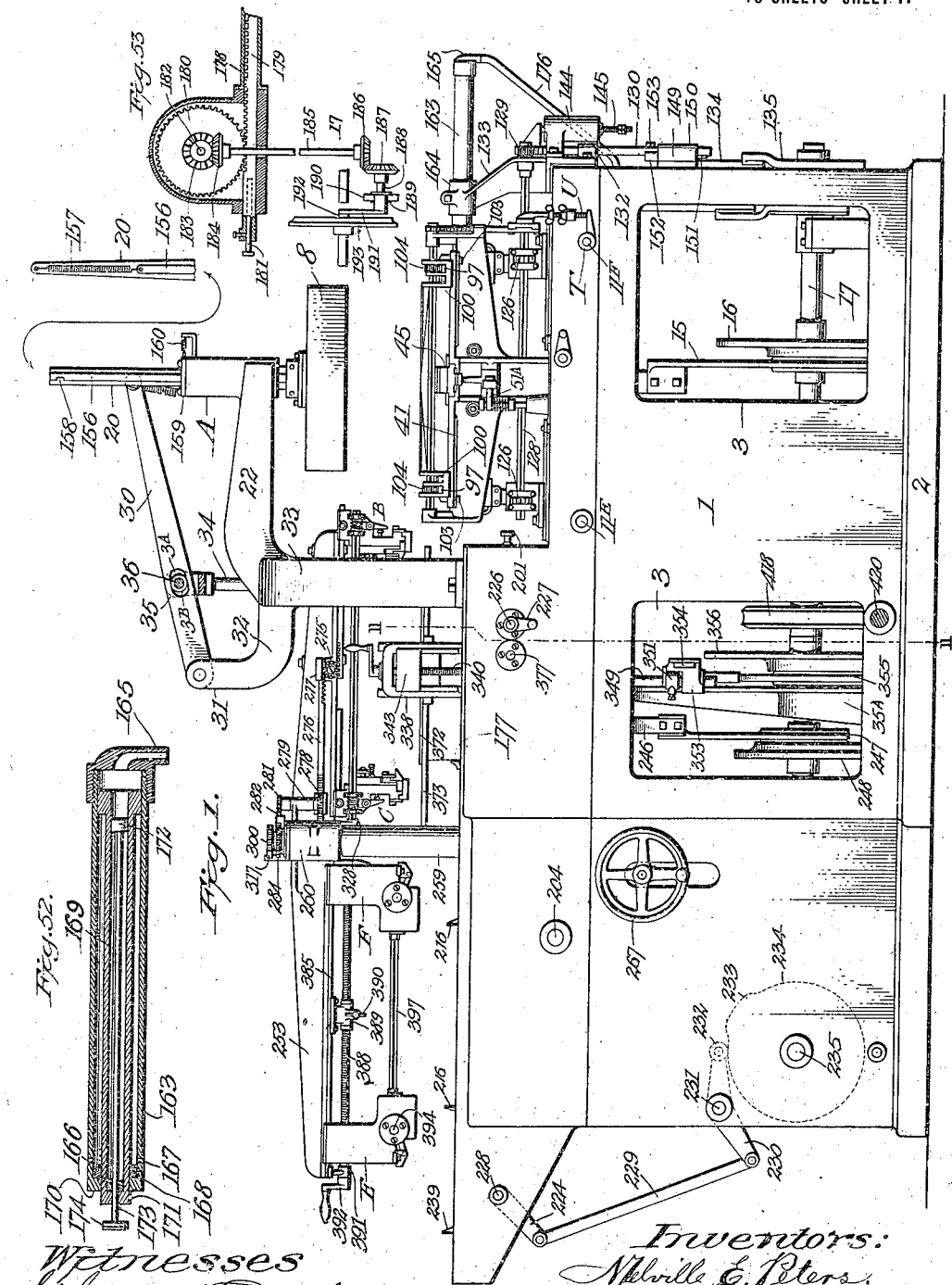

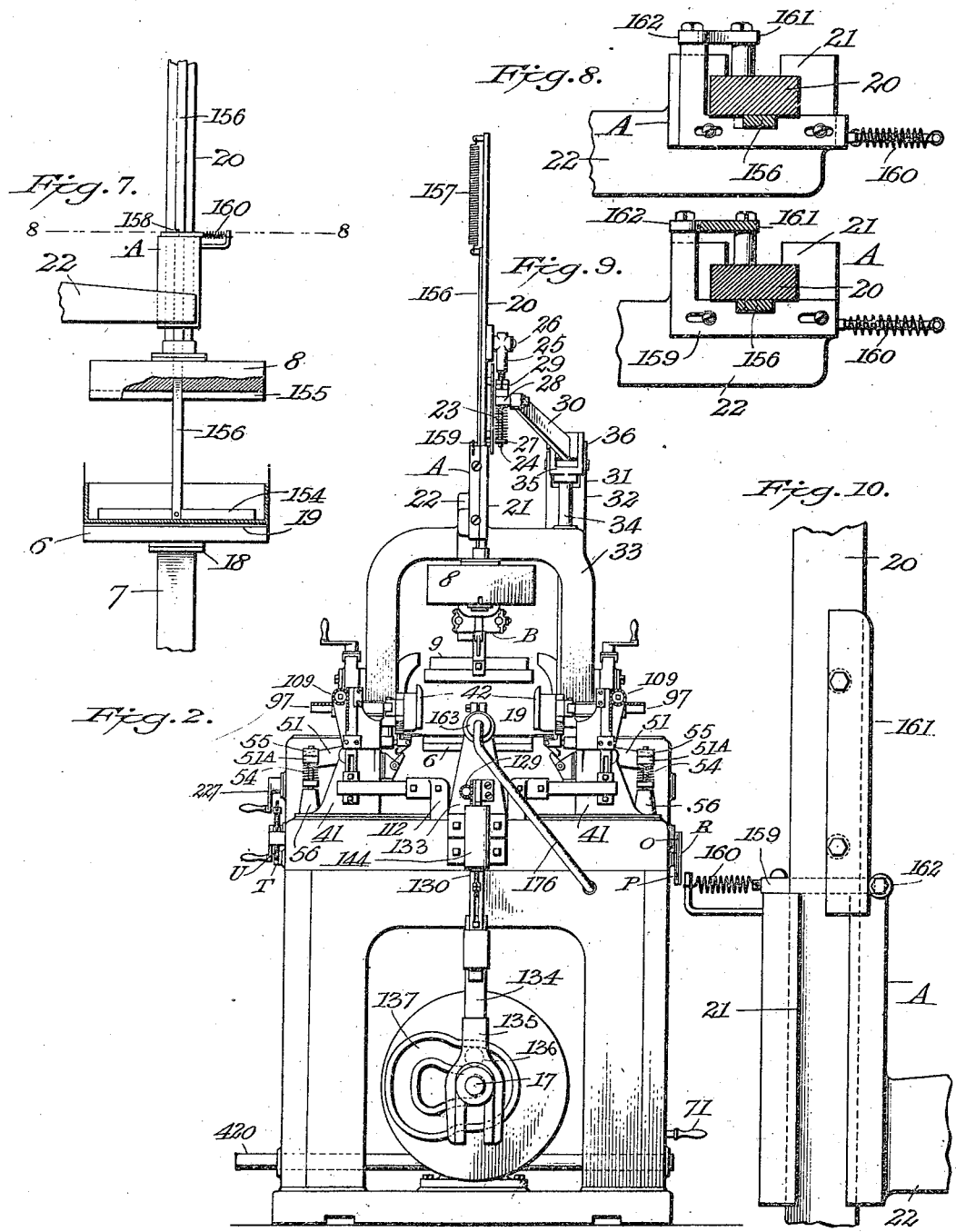

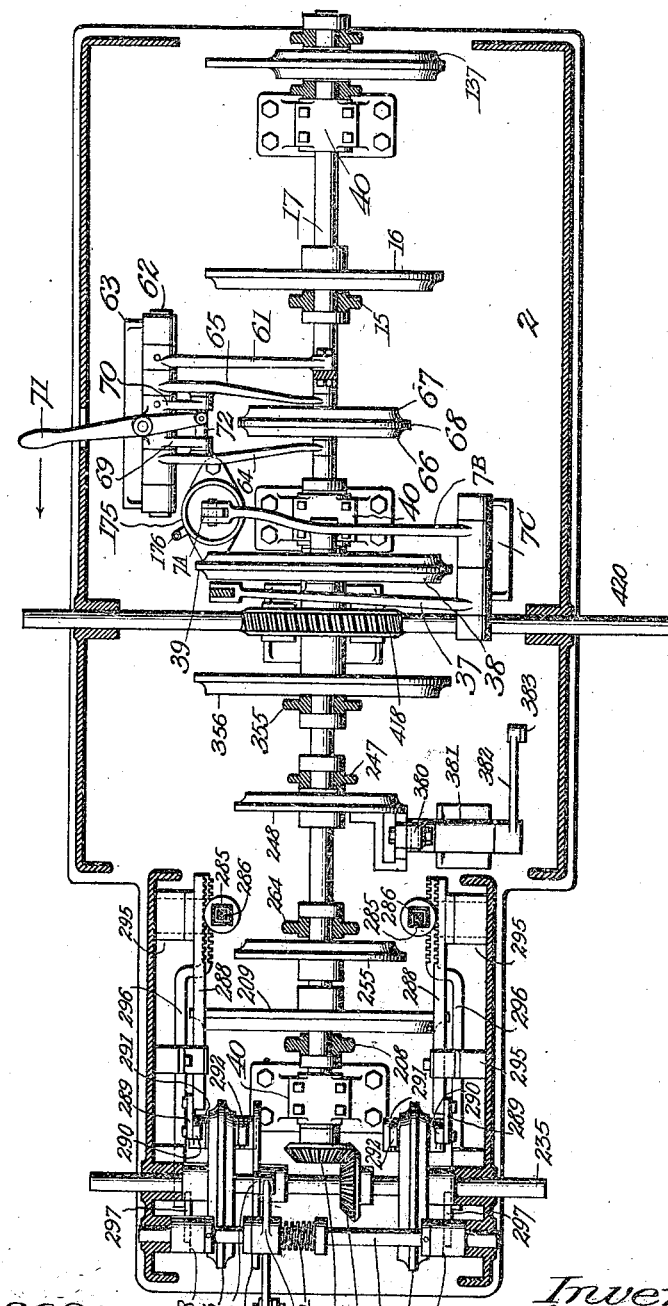

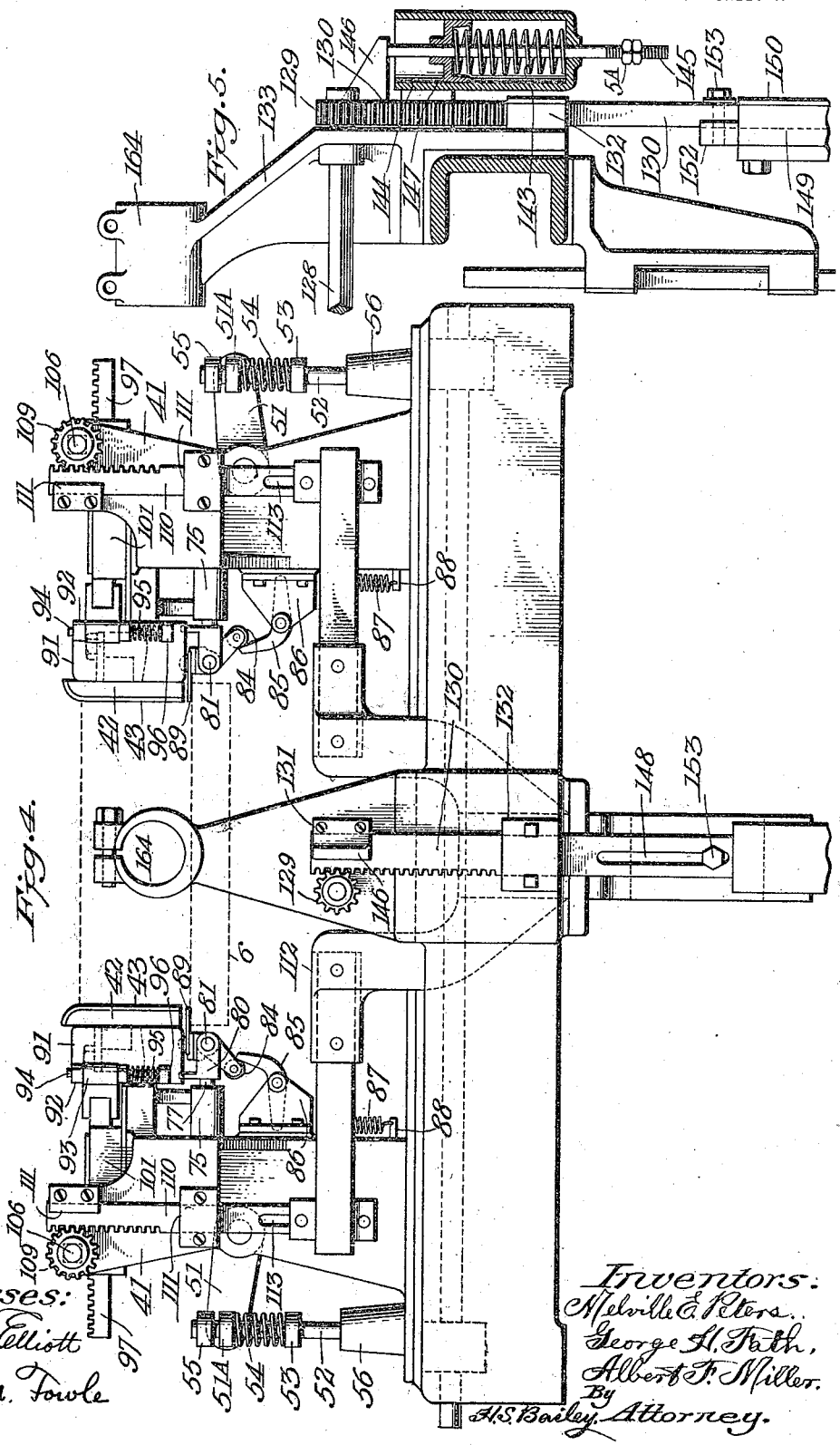

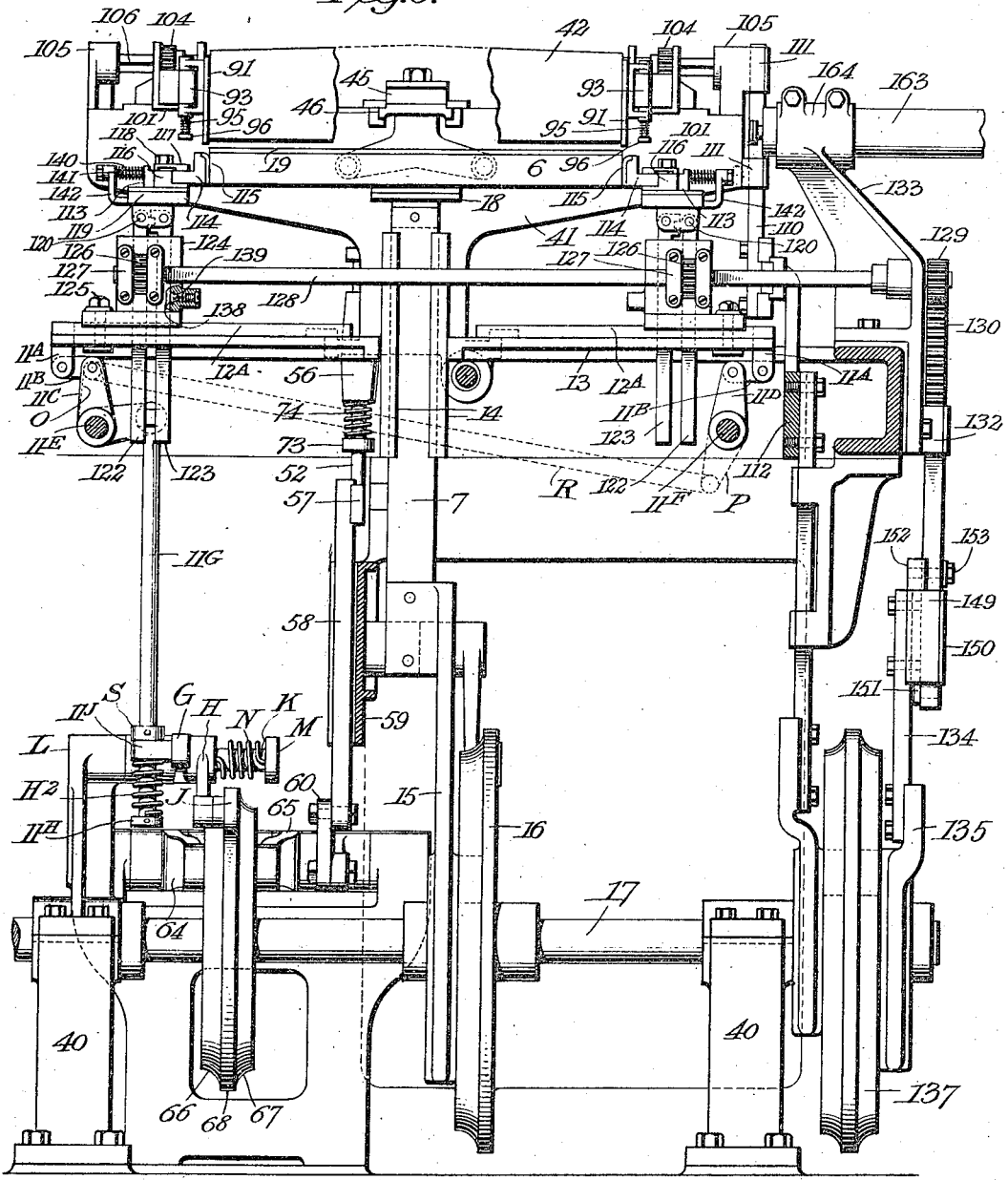

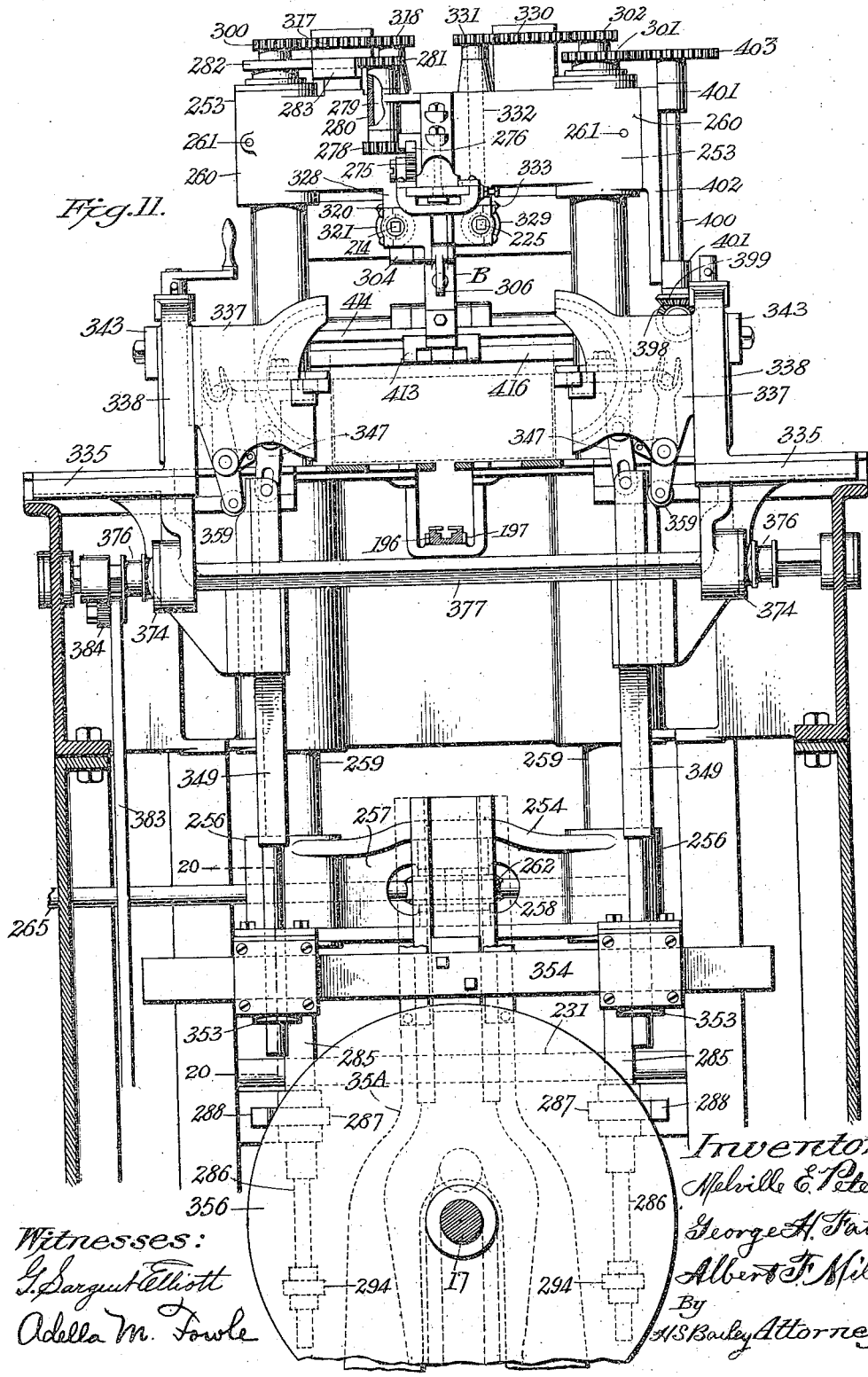

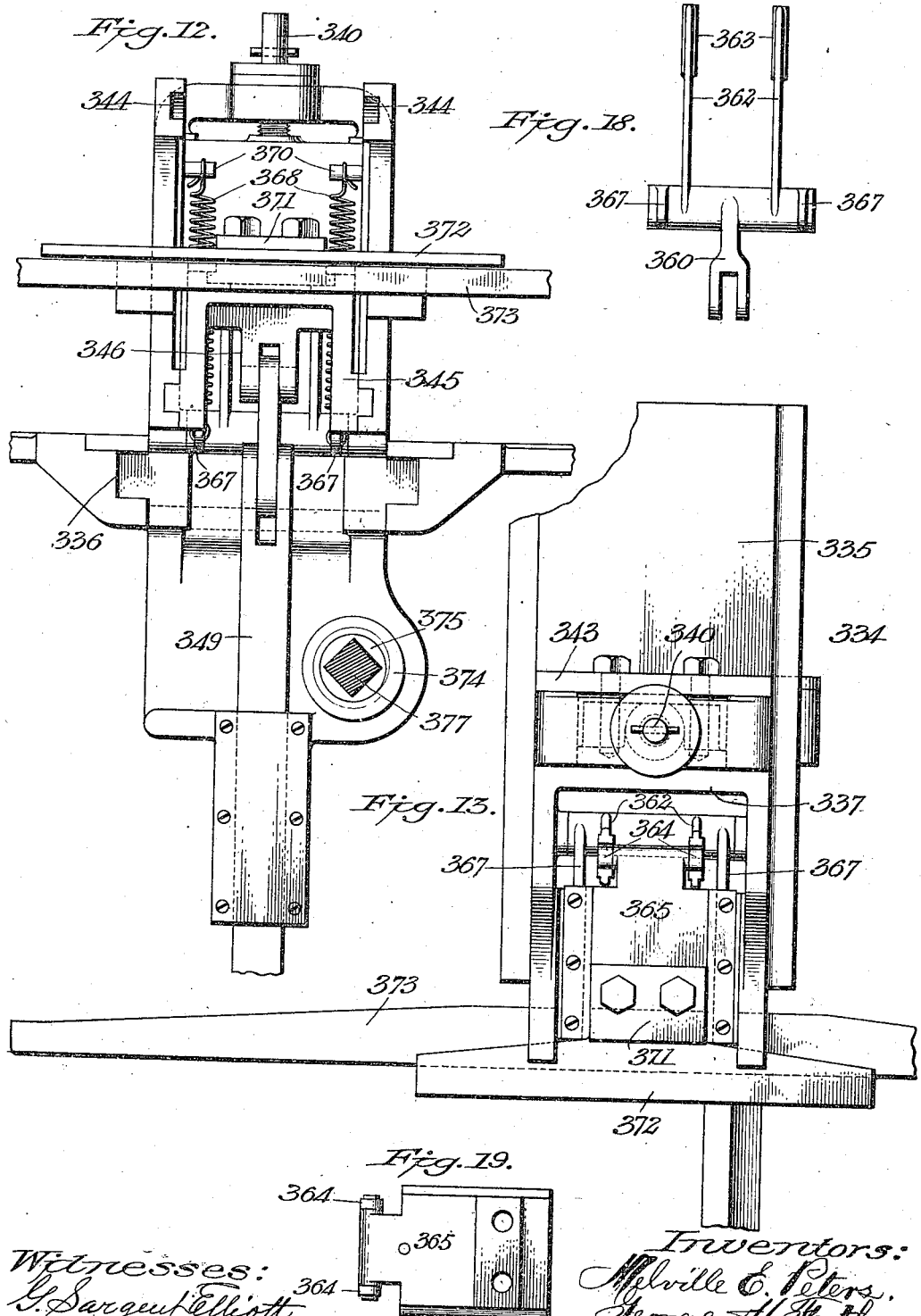

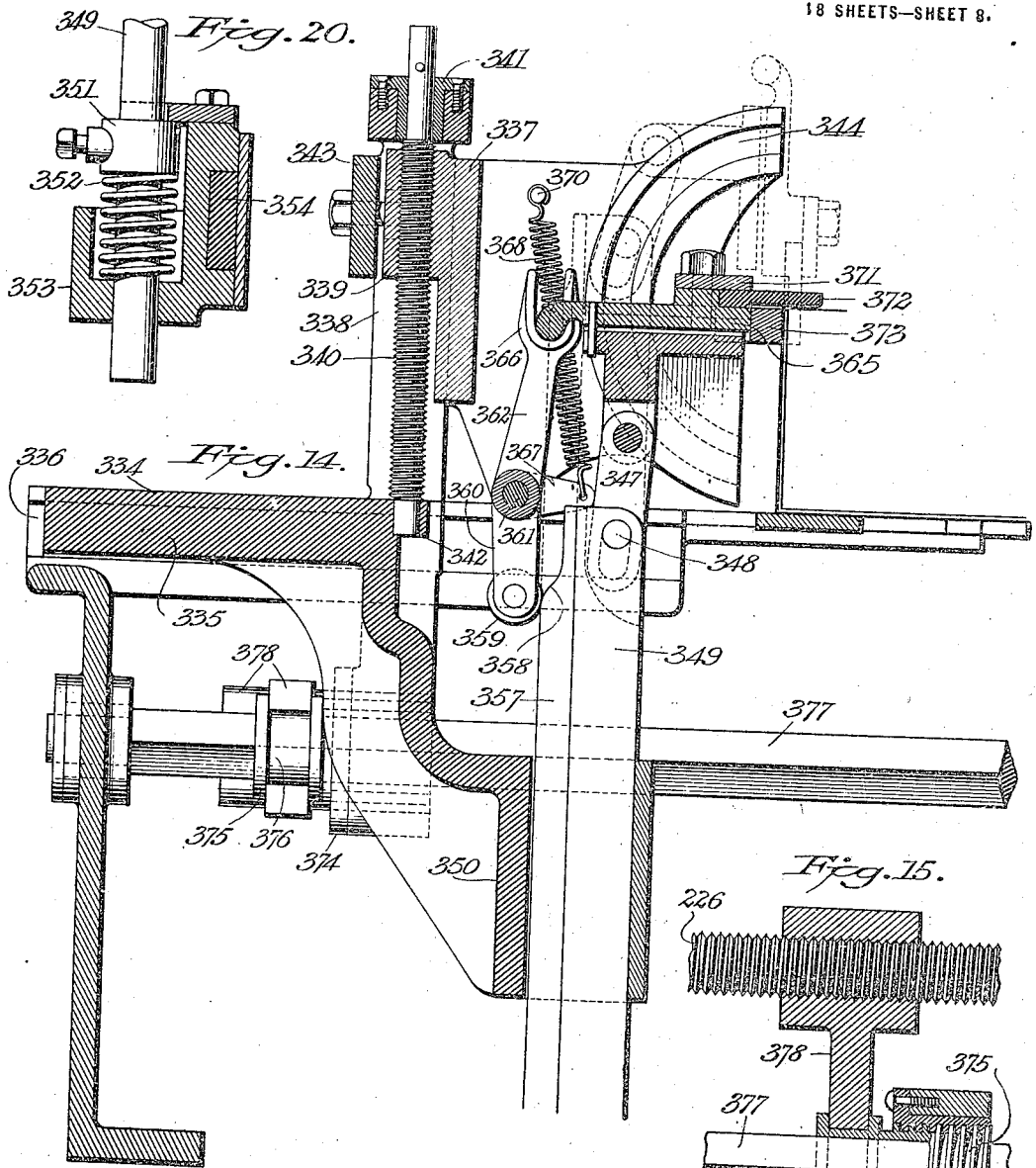

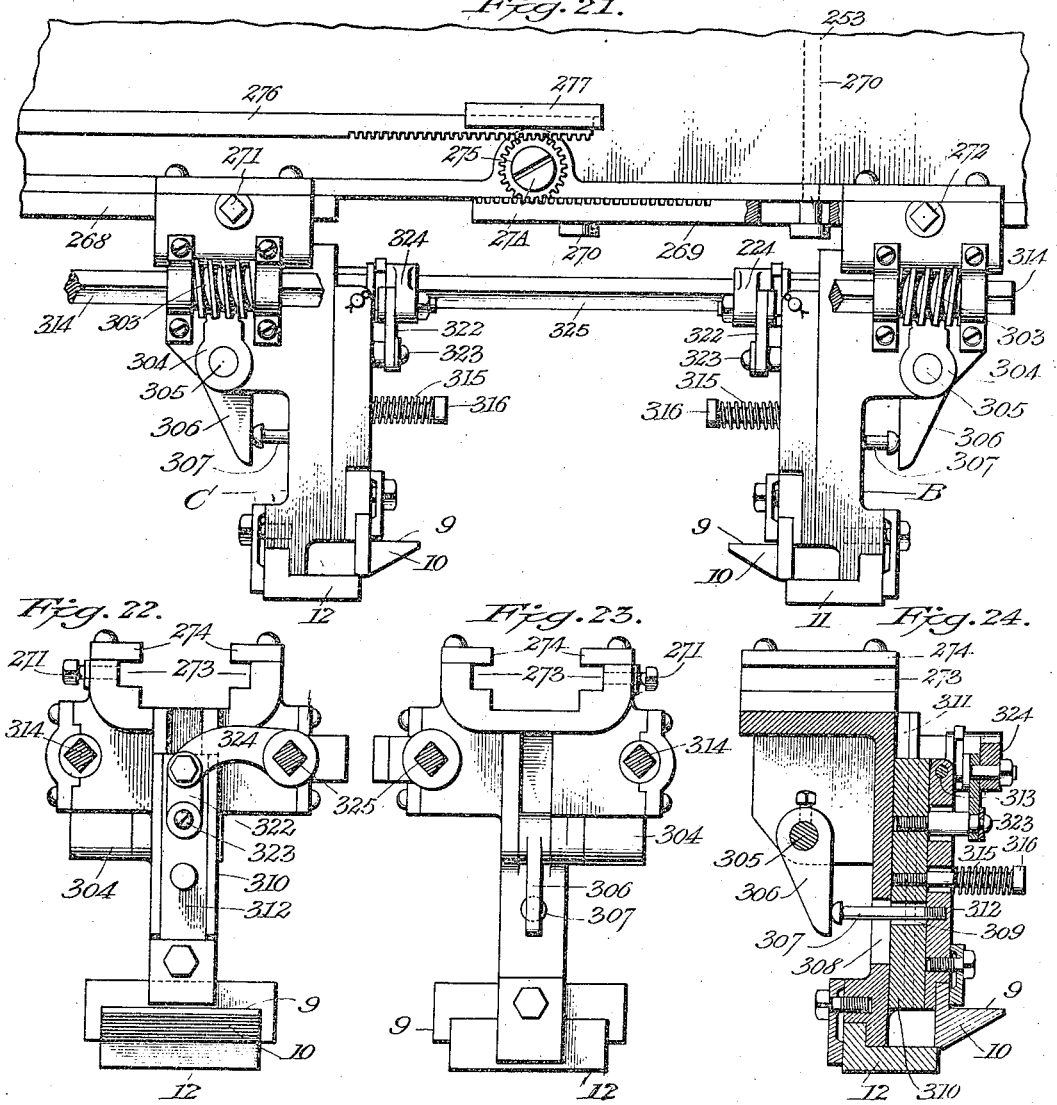

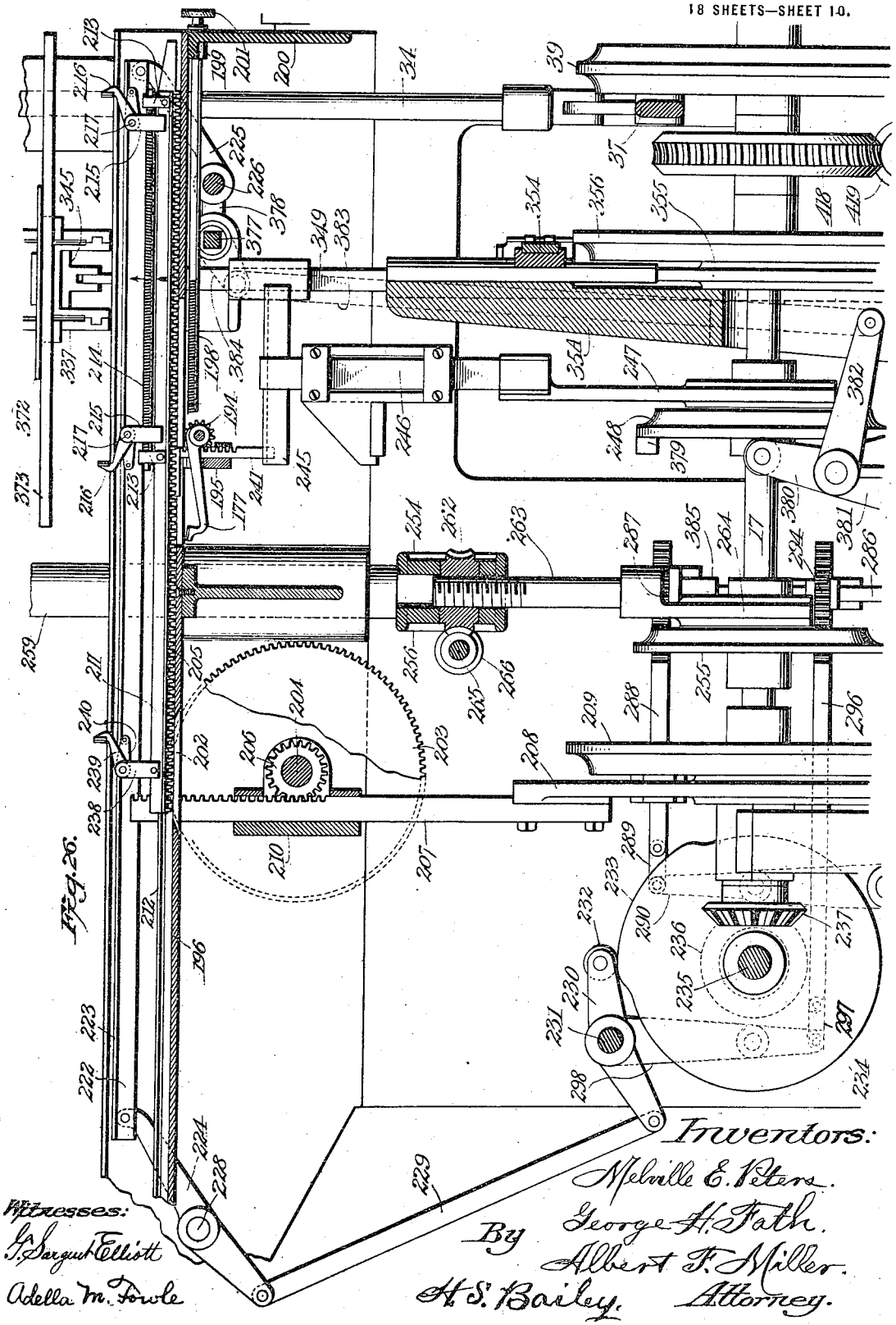

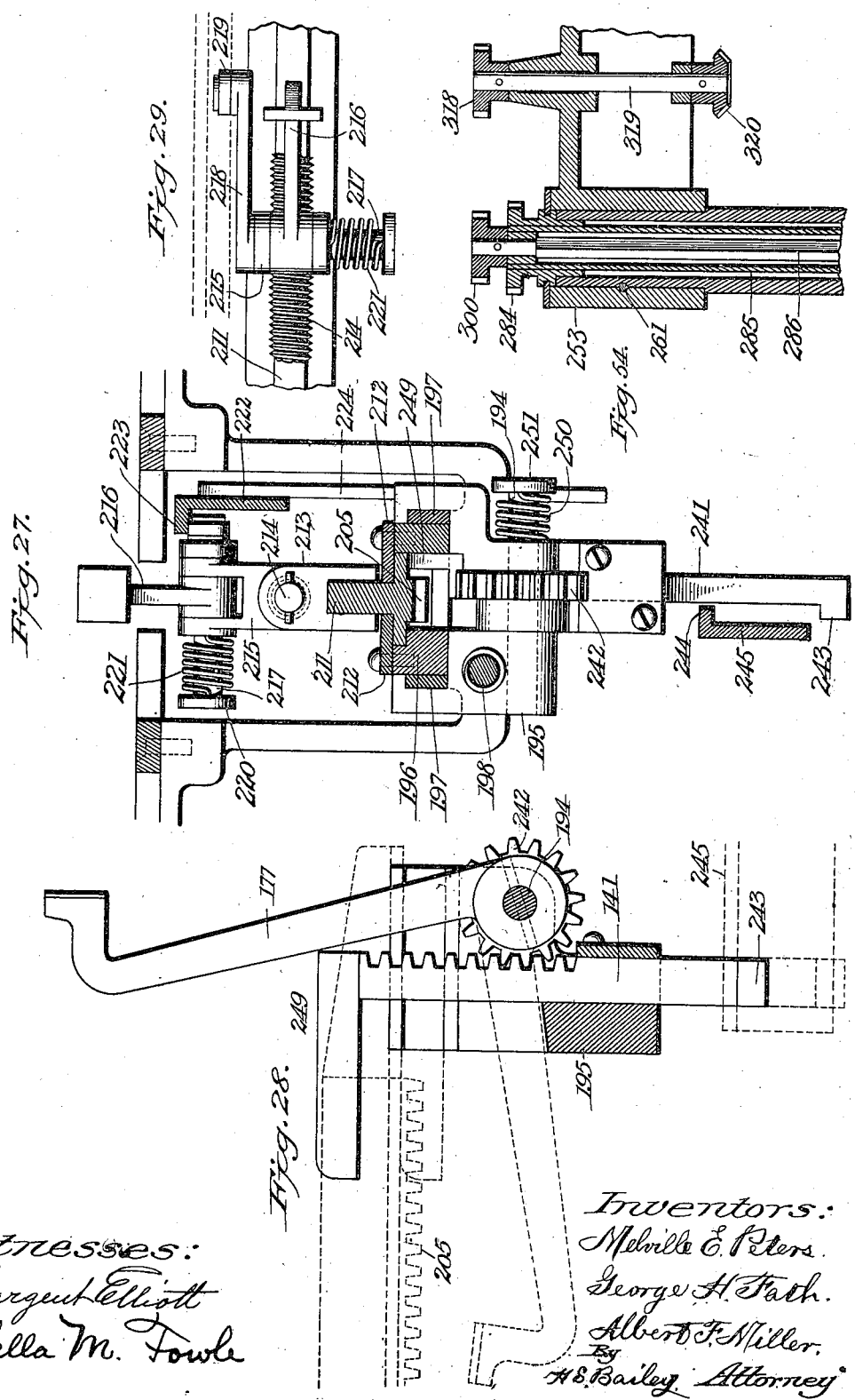

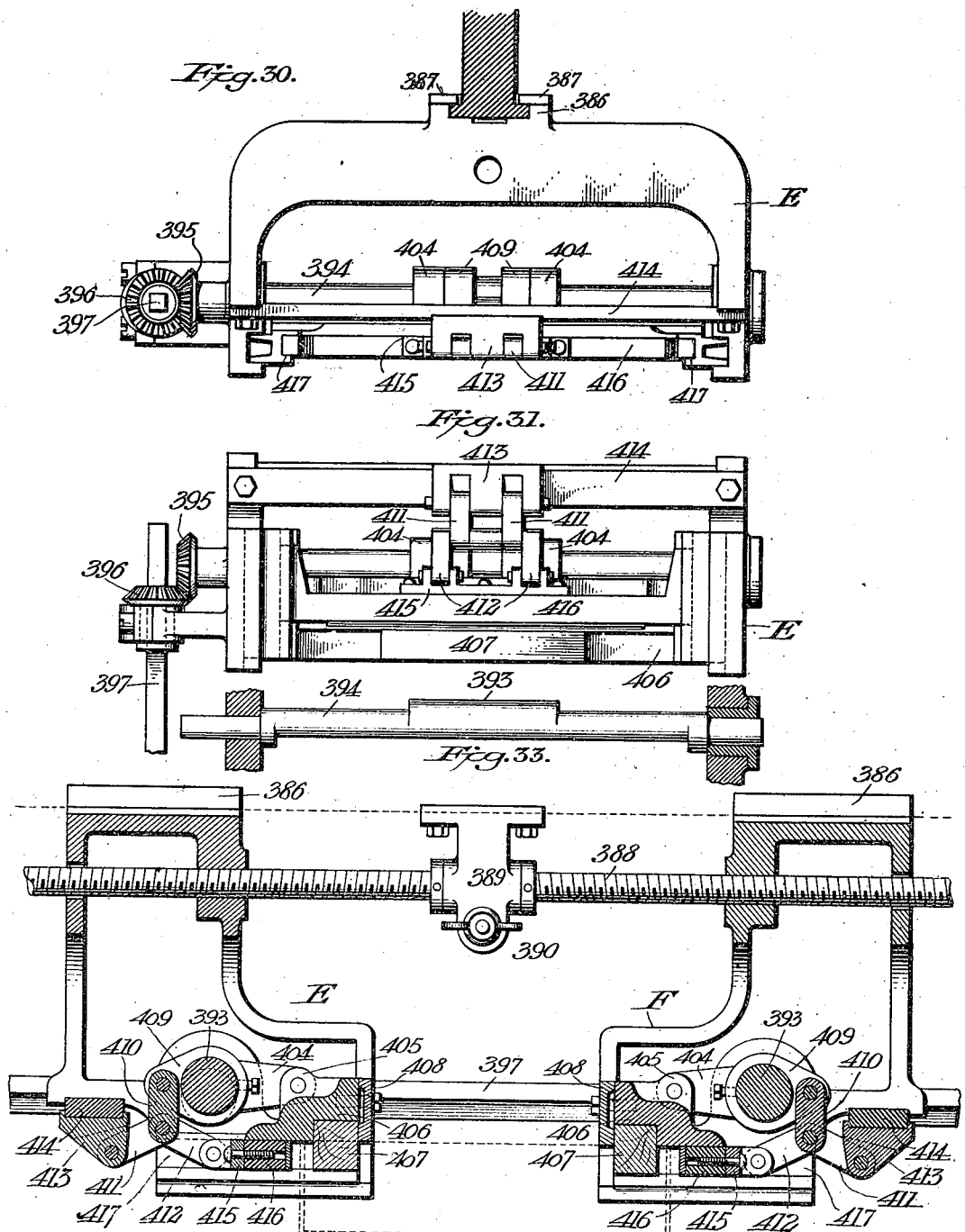

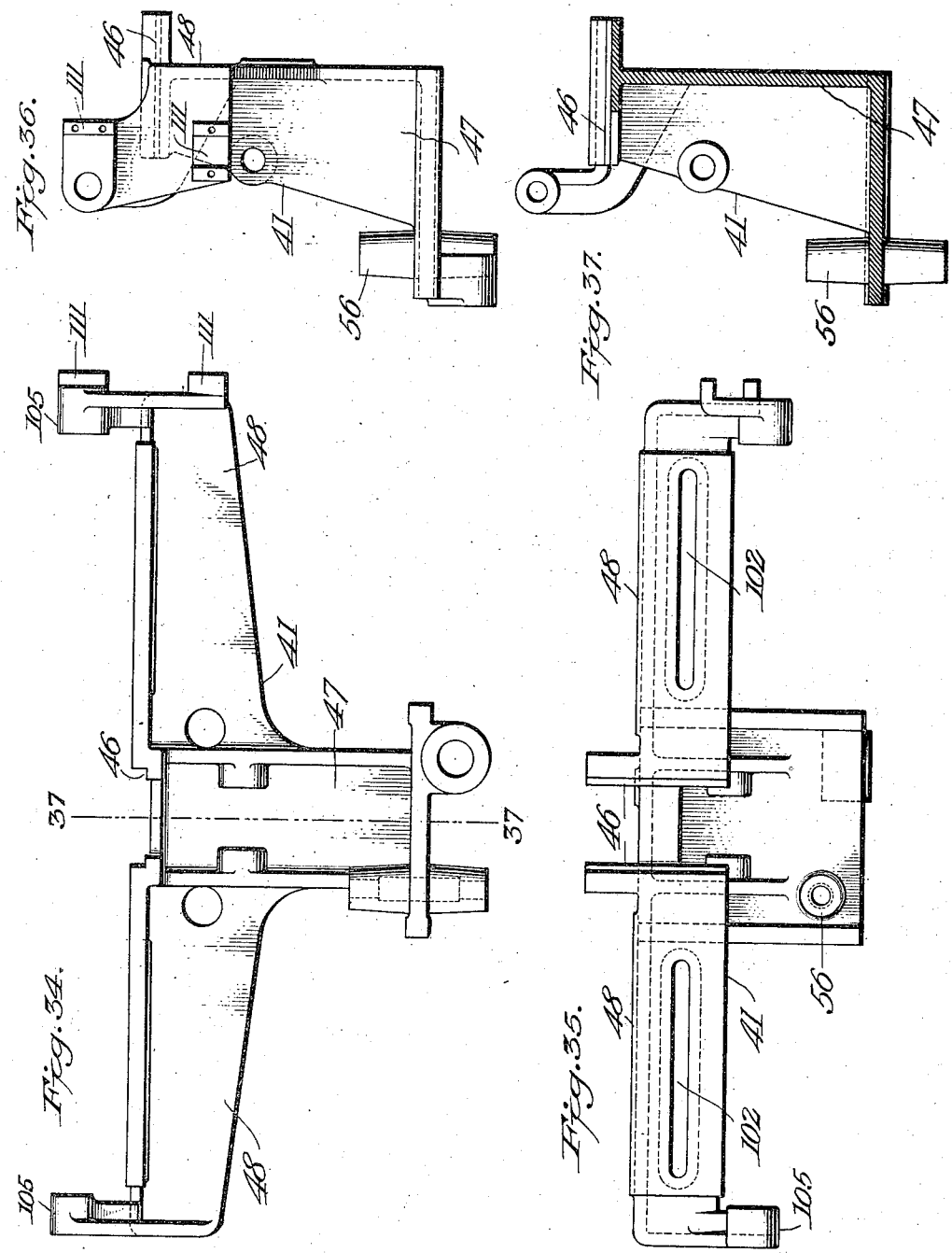

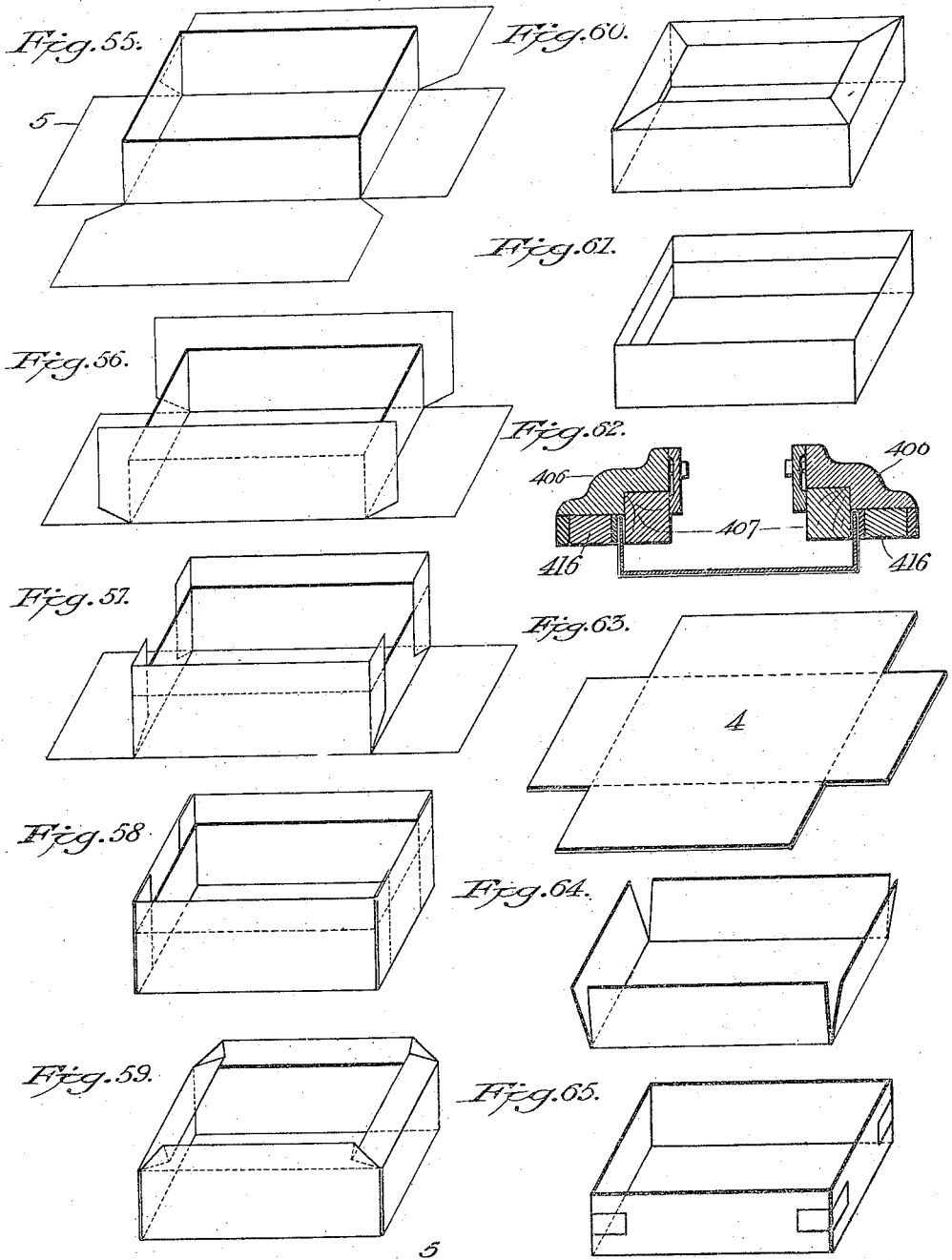

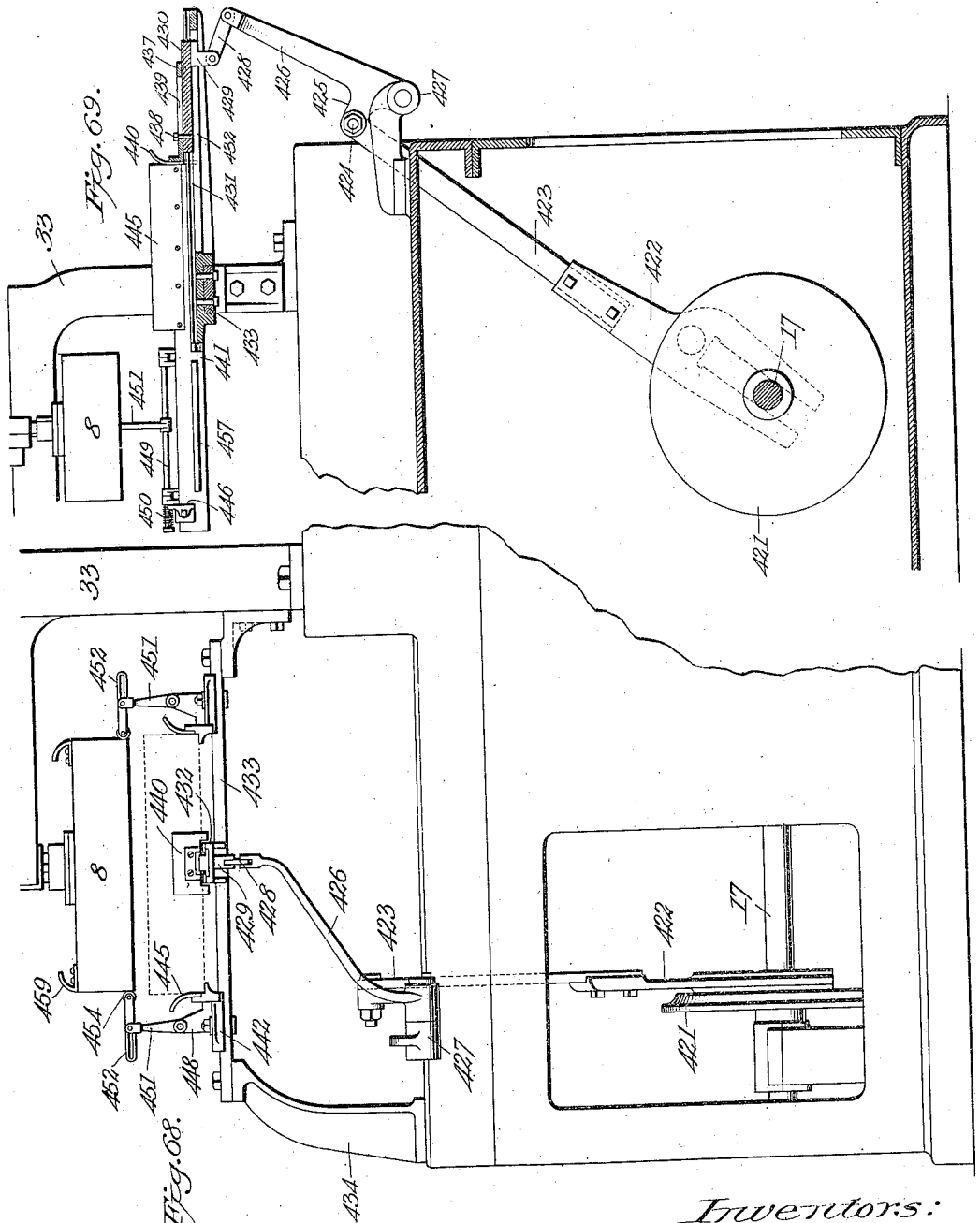

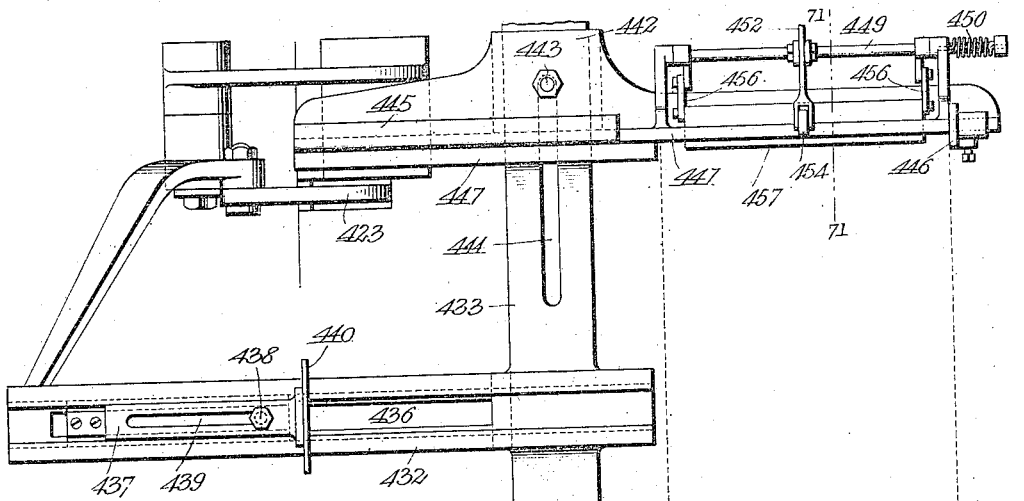
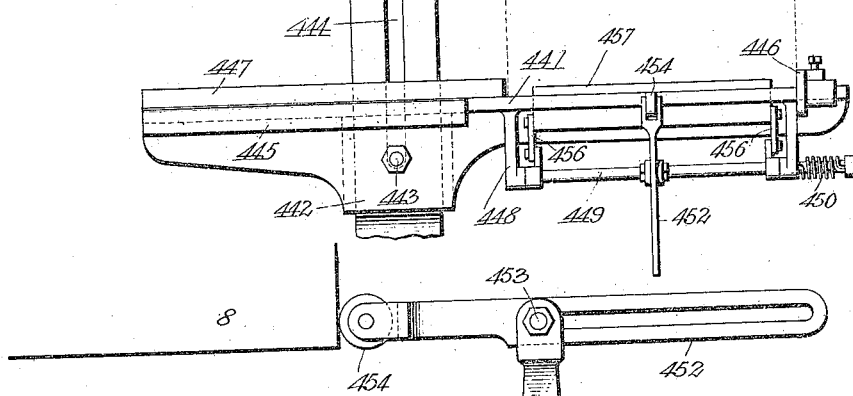
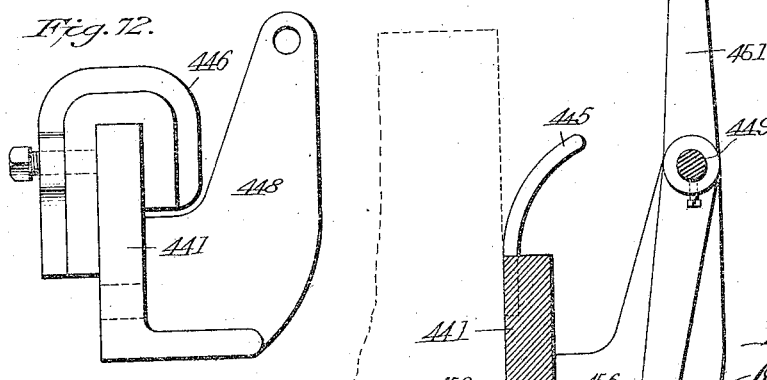

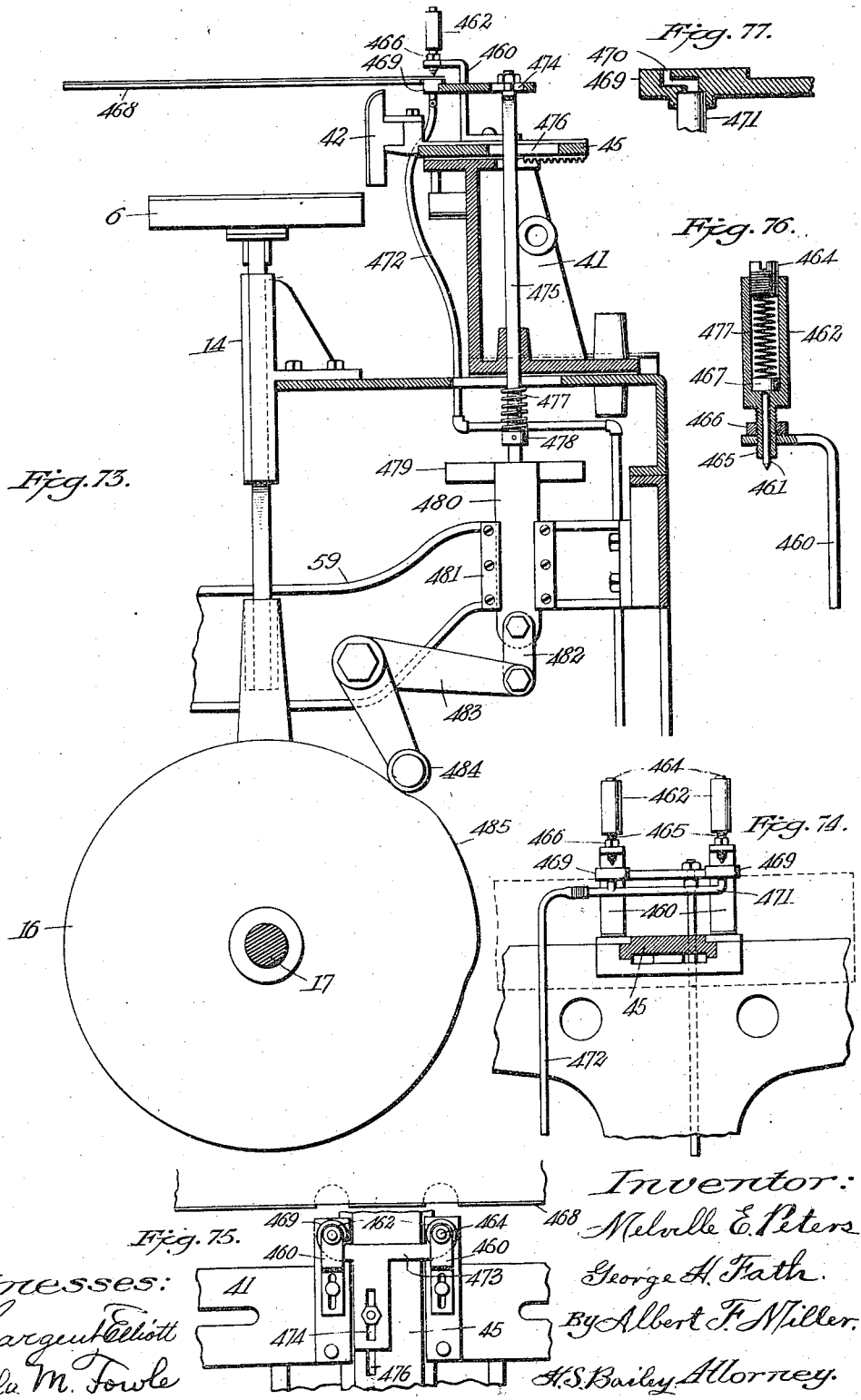

UNITED STATES PATENT OFFICE.

MELVILLE E. PETERS, GEORGE H. FATH, AND ALBERT F. MILLER, OF DENVER, COLORADO, ASSIGNORS TO THE PETERS PATENT RIGHTS COMPANY, OF DENVER, COLORADO, A CORPORATION OF COLORADO.

BOX-COVERING MACHINE.

1,251,811.  Specification of Letters Patent.  Patented Jan. 1, 1918.

Application filed November 5, 1915. Serial No. 59,860.

*To all whom it may concern:*

Be it known that we, MELVILLE E. PETERS, GEORGE H. FATH, and ALBERT F. MILLER, citizens of the United States of America, residing at the city and county of Denver and State of Colorado, have invented a new and useful Box-Covering Machine, of which the following is a specification.

Our invention relates to a multiple stage box covering or wrapping machine; and the objects of our invention are:

First, to provide means by which two or more boxes are fed through separated and different mechanism which cover or wrap each box by a series of step movements at each stage treatment of the machine.

Second, to provide a multiple stage box covering or wrapping machine, in which the box and the blank or label travels in right angular planes, the first steps or treatments of covering the box being performed by vertically operating mechanism and movements, and the remaining steps being performed while the blank and box are being advanced through horizontal movements that are at right angles to the vertical movements.

Third, to provide means by which boxes are covered and wrapped with blanks or labels in three different and independent stage or station treatments, while being moved automatically from one series of treatments at one stage, to another series of treatments at another stage or station.

Fourth, to provide means by which the blanks or labels and the boxes are fed automatically into our multiple stage box covering or wrapping machine, in such operative relation that the boxes are fed centrally onto the blanks, and rest on them in a position to be engaged by the blank folding mechanism. And Fifth, to provide a box covering and wrapping mechanism in which the capacity per machine is very greatly increased over the mechanism at present in use, by dividing the different covering and wrapping step movement mechanisms into three different separated and independent stages of treatment, thereby permitting three boxes to be passing successively through the machine at the same time and in quick succession, and thus tripling the capacity over box covering or wrapping machines feeding and covering or wrapping and carrying through the machine but one box at a time.

We attain these objects by the mechanism illustrated in the accompanying drawings, in which:

Figure 1, is a side elevation of the improved box wrapping machine.

Fig. 2, is a front end elevation thereof.

Fig. 3, is a plan view of the bed plate of the machine and parts supported thereupon.

Fig. 4, is a front elevation of the table portion of the machine, showing the side wipers, the end turning blades and mechanism by which these parts are operated, parts being omitted.

Fig. 5, is a side elevation partly in section of a portion of the front end of the table shown in Fig. 4, and illustrating a spring and its housing, which spring is used in connection with extension bottom work.

Fig. 6, is a central, vertical sectional view of the front portion of the machine, in which the first stage of the wrapping process is effected, and showing the relative positions of the side and end wipers and their connection with the main driving shaft.

Fig. 7, is a detail sectional view illustrating the upper and lower box plungers and the stripper, which acts to hold a box against the lower plunger when the upper plunger is withdrawn from the box and raised to its normal position.

Fig. 8, is a horizontal sectional view on the line 8—8 of Fig. 7, showing the stripper bar-retaining latch in engagement with the notch in the said stripper bar, as in Fig. 7, by which the stripper is held down while the upper plunger is rising.

Fig. 9 is a view similar to Fig. 8, but showing the latch disengaged from the notch in the stripper bar, as when the bar with the stripper is raised.

Fig. 10, is a side view of the head block shown in Figs. 7, 8 and 9, and of the opposite side thereof to that shown in Fig. 7, illustrating the cam which is carried by the upper plunger bar for engaging a roller on the stripper bar latch to normally hold the said latch in the position shown in Fig. 9.

Fig. 11, is a transverse vertical sectional view on the line 11—11 of Fig. 1, looking toward the rear end of the machine.

Fig. 12, is a front view of one of the side-turn-in mechanisms, the slideway in which it is mounted being shown.

Fig. 13, is a plan view of the side-turn-in mechanism shown in Fig. 12.

Fig. 14, is a vertical, longitudinal sectional view of the side-turn-in mechanism, the same being mounted in its slideway.

Fig. 15, is a fragmental horizontal sectional view showing a portion of one of the side-turn-in supporting brackets, provided with a threaded bushing block through which passes the square rod shown in Figs. 12 and 14, also a threaded feed rod, and an arm connecting the same with the bushing block, by which the said bracket is moved in its slideway.

Figs. 16 and 17 are respectively a side and a front elevation of the side-turn-in segment block which supports the slide upon which the blank turning blade is secured.

Fig. 18 is a front view of the rock lever which operates the slide.

Fig. 19 is a plan view of the slide.

Fig. 20 is an enlarged sectional view on the line 20—20 of Fig. 11.

Fig. 21, is a side view of the two end-turn-in mechanisms and a portion of the support upon which they are mounted.

Fig. 22 is an end view of one of the mechanisms.

Fig. 23 is a view of the opposite end of Fig. 22.

Fig. 24 is a central, vertical, longitudinal sectional view thereof.

Fig. 25 is a plan view of the same.

Fig. 26 is a longitudinal vertical sectional view through the rear portion of the table, showing the mechanism by which a box is caught at the second stage of its treatment, and passed to the third stage, and thence discharged.

Fig. 27 is a transverse vertical sectional view on the line 27—27 of Fig. 26.

Fig. 28 is a vertical longitudinal sectional view through the stop mechanism by which the boxes are engaged as they pass to the second stage treatment.

Fig. 29 is a plan view of one of the box transferring mechanisms.

Fig. 30 is an end view of one of the mechanisms for pressing the turned-in blanks upon the ends of the boxes.

Fig. 31 is a bottom plan view of the same.

Fig. 32 is a vertical longitudinal sectional view of the blank end pressing mechanisms in coöperative relation, the pressing members being open or separated and a box being shown in dotted lines, the ends whereof are in position to be operated upon by the pressers.

Fig. 33 is a side view of the cam shaft which operates the levers by which the pressers are moved toward and away from each other.

Fig. 34 is a front elevation of one of the standards which support the side wipers, the end corner turning blades, and other mechanism connected with these parts.

Fig. 35 is a plan view of the standard.

Fig. 36 is an end view thereof.

Fig. 37 is a vertical sectional view of the same on the line 37—37 of Fig. 34.

Fig. 38 is a side elevation partly in section of one of the side wiper supports, with a wiper clamped thereto.

Fig. 39 is a front view of the same, the wiper being removed.

Fig. 40 is a side view of one of the toothed bell crank levers which operate the side wiper.

Fig. 41 is a front view of the same.

Fig. 42 is an end view of one of the blocks to which the corner turning blades are hinged.

Fig. 43 is a plan view thereof showing one of the corner turning blades in dotted lines, in position upon the said block.

Figs. 44 and 45 are respectively a side and an end view of one of the slideway brackets which support the pairs of toothed bars which are pivotally attached at one end to the blocks which carry the corner turn blades.

Fig. 46 is a plan view of the slideway bracket shown in Figs. 44 and 45, together with the parts carried thereby.

Fig. 47 is a front view of the device carried by the side wiper support and which is used in connection with extension bottom work.

Fig. 48 is an end view of the same.

Fig. 49 is a plan view of the bracket member of the device shown in Figs. 47 and 48.

Figs. 50 and 51 are respectively a front and an end view of the tilting presser blade support carried by the said bracket.

Fig. 52 is a longitudinal sectional view of the pneumatically operated device for transferring the boxes from the first to the second stage of its treatment.

Fig. 53 is a view illustrating a mechanically operated box transferring device.

Fig. 54 is a vertical sectional view through a portion of the vertically movable overhead arm and one of its hollow standards showing the shafts which extend through said standards, the gear wheels carried thereby, and other mechanism.

Figs. 55 to 61 inclusive, are perspective views illustrating the different stages in the box covering process.

Fig. 62 is a sectional view illustrating the manner of pressing the turned in ends of the blank against the ends of the box, whereby the box covering operation is completed.

Fig. 63 is a perspective view of a blank from which a box is made.

Fig. 64 is a perspective view of a loose or open cornered box.

Fig. 65 is a perspective view of a box having its corners secured by stickers.

Fig. 66 is a perspective view of a tight-wrap blank showing the entire surface thereof coated with gum.

Fig. 67 is a perspective view of a loose-wrap blank showing the gummed portions thereof.

Fig. 68 is a side view of a portion of the machine, showing the mechanism for delivering the boxes to a position between the plungers in the first stage treatment.

Fig. 69 is a transverse, vertical sectional view through the portion of the machine shown in Fig. 68, and centrally through the said box delivering mechanism.

Fig. 70 is a plan view of the box delivering mechanism on an enlarged scale.

Fig. 71 is a vertical sectional view on the line 71—71 of Fig. 70.

Fig. 72 is an end view of one of the guide bars showing the adjustable stop for defining the inward movement of the boxes.

Fig. 73 is a transverse vertical sectional view of the machine taken centrally of the plungers and side wipers, and showing the mechanism for receiving and holding the gummed blanks as they are delivered from the blank gumming machine during the withdrawal of the delivery table, and the upward movement of the lower plunger to receive it.

Fig. 74 is a front view of the receiving and holding mechanism shown in Fig. 73.

Fig. 75 is a plan view of the same.

Fig. 76 is a vertical sectional view through one of the tubes which support the spring pressed pins between which and the suction members the edges of the gummed blanks are caught as they are delivered from the gumming machine. And Fig. 77 is a sectional view through one of the suction members which hold the blanks after they are released from engagement by the said pins.

Similar letters of reference refer to similar parts throughout the several views.

Referring to the drawings,—

The numeral 1 designates the supporting frame of our machine. This frame is of a hollow box shape, and it has a base plate portion 2, and a flat table portion at its top, and has openings 3 in its sides through which the mechanism in its interior may be reached and inspected, and oiled and adjusted if necessary, and we term it a table frame.

Our present box wrapping machine covers and wraps square rectangular or parallelogram shaped boxes that are called box-shells, and that are folded up from pieces 4 of pasteboard that are cut out of sheets of pasteboard. These pieces of pasteboard are cut to sizes and shapes and are creased and folded up into box shaped shells, the corners of which are fastened together by gummed paper strips called stickers. Special pasteboard cutting, scoring, folding up mechanism and for applying the stickers is used, that is especially adapted to perform these several special features. Consequently these pasteboard box shells are fed to our box wrapping machine ready to be covered or wrapped by a covering blank.

The covering and wrapping blanks 5 consist of pieces of a plain thin smooth or calendered surfaced paper or of artistically surfaced pieces of paper or of other suitable material, which is cut out of large sheets of the paper or other material that is used to the right size and shape to cover or to be wrapped around the size of the boxes they are intended for. These blanks may be of any color desired, and the paper or other material of which they are made should be thin and strong and pliable enough to fold closely around the corners and against the surfaces of the boxes. These blanks are coated either wholly or partially on one of their sides with adhesive gum or glue, which may be applied to them in a blank gumming machine, a new type of which is embodied in our pending application Serial Number 30471, filed May 25, 1915.

There are three different systems of covering and wrapping boxes used in the art of pasteboard box making. One of these is known as the tight wrap box covering system; another is known as the loose wrap box covering system; and the third is the extension bottom system. The tight wrap system is used on box shells that have their corners stayed or fastened together by gummed stickers, as is shown in Fig. 65, and also on boxes that have their corners unstayed or with their corners folded up and loose, as shown in Fig. 64. Boxes that are to be wrapped by the loose wrap system always have their corners stayed and are most generally made without extension bottoms. Our present covering and wrapping machine will cover boxes according to either of these systems. We will however first describe the tight wrap system of covering boxes and the mechanism by which it is accomplished in our machine.

In Figs. 55 to 61 inclusive, we illustrate the different step treatments that are given to each blank to cover and wrap each box with it, as the box and label are fed into and through our box covering and wrapping machine. These different relative progressive step treatments of covering and wrapping the blank around its box, are as follows:

In Fig. 55, the box shell is shown resting on the blank 5, in which relative position the blank and box are fed automatically in the following manner: The blank 5 is first fed from our gumming machine above mentioned directly and centrally over the blank receiving platen 6 of the box covering and wrapping machine, with its gummed side facing upward. The blank receiving platen in our machine is a flat top surface of a reciprocating plunger 7, which in its operative movement first moves vertically upward to its blank receiving position, where it receives a blank from the gumming machine, and each blank is delivered to the wrapping machine and is held centrally over the top surface of the lower plunger for a few seconds by an air suction operating nozzle that may be mounted on the wrapping machine and that may be operated by mechanism mounted on and operated by the gumming machine.

Instantly after the blank is delivered to the wrapping machine on top of the lower plunger, the box-shell is automatically fed into the wrapping machine by mechanism to be presently described, which box feeding mechanism places the box-shell directly and centrally over the top of the blank, which is then instantly released from the air suction operating blank gripping nozzle. Then the box shell and the nozzle are positioned as shown, the blank resting on the plunger and the box resting on the blank or label, in which position the box shell receives the box form 8 of the upper reciprocating plunger, which as it descends enters the box-shell and presses its bottom down against the gummed blank, which is supported by the lower plunger and which during this pressure movement of the upper plunger offers sufficient resistance to the pressure of the upper plunger to glue the bottom of the box-shell to the blank or label.

Our invention contemplates the gluing of blanks or labels to the bottoms of the boxes and the folding up and gluing of gummed blanks against the sides and ends of the box shell by alternate vertical reciprocal movements of the upper and lower plungers working coöperatively together in combination with two opposing sets of brushes or wipers, as will be presently described, and four of the eight step treatments that are necessary to completely cover and wrap the boxes in our three stage wrapping machine are performed by and during the vertical manipulations of these plungers and their coöperating brushes or wipers. Consequently we claim as a new and distinctly novel and valuable feature of our invention, not included in the blank gumming machines at present in use, that the box-shell in being covered and wrapped is moved in a right angular direction through the machine, the first part of which is a series of alternating vertical movements, and the second a series of horizontal movements. This right angular movement of the box shell and label is essential to accurate and rapid work, and it enables our machine to discharge in perfect form about forty covered and wrapped boxes per minute, which is about three times the capacity of any box covering and wrapping machine at present in use in the pasteboard box making art.

The second step treatment comprises the turning or folding up and pressing the gummed surfaces of the opposite sides of the gummed blank against the opposite sides of the box-shell, as indicated in Fig. 56.

The third step treatment consists of turning or folding the opposite ends of the opposite sides of the gummed surface of the blank inwardly and against the ends of the box-shell, as shown in Fig. 57.

The fourth and last step treatment of the two reciprocating plungers is to fold up the gummed ends of the blank against the ends of the box-shell and over the ends of the blank that have just been glued against the ends of the box, which completes the covering of the bottom and sides and ends of the box shell, as shown in Fig. 58, and leaves the opposite end and side edges of the blank projecting vertically above the top edges of the box far enough and in proper position to be wrapped over and down into the interior surface of and against the sides and ends of the box interior.

Before these upwardly projecting ends of the blank are turned into the box, however, the partially covered box is released from the upper and lower plungers, and is then shot by an ejector mechanism which will be presently described, to the mechanism of the second stage portion of our machine, where the vertically projecting side and end edges of the blank are folded and wrapped over and down into and against the sides and ends of the inner surface of the box.

The fifth step treatment consists of first properly positioning the box and then of forcibly holding it by a downward pressure in its proper position, and of then wrapping the projecting vertical ends of the blank around the edges of the box and of gluing them against the inside surfaces or interior of the box, and this treatment is given to the blank at the second stage portion of our machine. Shoe members 9 having upwardly tapering soles 10 that enable them to slide over and against the vertically projecting end members of the blank, first engage the blank ends and the box in the following manner: When the box is ejected from the first stage treatment plungers into the mechanism of the second stage, it strikes a stop arm and stops. The blank edge turning mechanism under which the box has to pass when it enters the second stage portion of the machine, has a horizontal reciprocal movement that enables it to occupy a position at a short distance from the position the box stops at when it strikes the stop arm, and the instant the box is stopped by the arm the arm 253 drops and a block 11 on this end turn in mechanism is moved up against the box and pushes it against a similar block 12 carried by the opposite end turn in mechanism, in which position it can be engaged by the side turn in mechanism. When this reciprocating end turn in mechanism moves forward, the taper sole portion of its shoe engages the vertical edge of the blank that projects vertically above the box, as shown in Fig. 58, and pushes it over into the box into a position substantially horizontal and at right angles to the sides of the box, and as the box is moved into operative relation to the opposite blank turn in end mechanism, which is fixed against longitudinal movement relative to the position of the box to receive it, the adjacent vertically projecting end of the blank strikes against the taper sole of its shoe, as the box is pushed by the opposite block 11 against the block 12, and this edge of the blank folded over the edge of the box as the box moves under it into a substantially horizontal position. The two opposite blank end turn in mechanisms both move vertically upward above and away from the end edges of the box and leave these free ends of the blank standing folded over into the box in horizontal planes at substantially right angles to the ends of the box, as shown in Fig. 60. The opposite side blank turning in mechanisms then move against the vertically projecting side edge of the blank, and this step in the second stage treatment constitutes the sixth step treatment, and is as follows:

The sixth step treatment consists of pushing the vertical projecting side ends of the blanks over and into the interior of the inside edges of the box, and carrying them by a continuous movement over and down the inside edges of the box against the interior of the box, and leaving them glued to the edges of the box, and the mechanism that performs this step reciprocates on opposite sides of the box shell and leaves these side ends of the blanks glued to the opposite inside edges of the sides of the box, as shown in Fig. 61.

Instantly after the side turn in blades have moved against the side edges of the box on its interior, and while they are in this position, the end turn in blocks again move down in the ends of the box and they fit snugly between the side bars; as they move down they engage the ends of the blanks, the opposite corners of which have been moved down by the side blades, at the corners by the overlapping side ends of the sides of the blanks, which as they are folded over into the interior of the box and against the side edge of the interior of the box naturally move down and engage and carry the opposite edges of the horizontally positioned ends of the blank and carry them down under them. The greater part of the ends of the blanks by the side blades and the turn in blades at the opposite ends of the box follow the side blades down into the box and press the ends of the blank against the inside edges of the interior of the box, thus completing the box, as shown in Fig. 61.

This completes the second stage step treatment of covering and tight wrapping the box shell with the gummed blank.

The covered and tight wrapped box is then fed from the second stage box and blank treatment portion of the machine to the third stage treatment, which consists of mechanism that enters and straddles the ends only of the blank covered and wrapped box, and pinches the ends and especially the corners at the junction of the sides and ends of the box, as shown in Fig. 62, and thus presses the still damp overlapping edges of the blank at these corners down into compact smooth sharp corners. This corner pressing action completes the box, which is now discharged from the machine.

The above description of the step movements explains the different step treatments that are given to the box and blank at each of the three stage portions of the machine, and will make the detail description of the mechanism of these different stage portions of the machine easier understood, as these three stage portions of the machine will be described in the progressive order of their box and blank treating operations, beginning with the first stage, and the detail description of the mechanism of each stage will apply only to the mechanism that effects the step treatments the blank and box coöperatively receive when in that particular stage portion of the machine.

The detail description of the first stage portion of our box covering and wrapping machine and its operative movement in the four different step treatments it gives to the blank and box in covering the outside, bottom, sides and end portions of the box shell with a tight wrapping that is glued tightly and smoothly to the entire outside surface of the box, is as follows:

Through the center of the table portion 13 of the machine, an aperture is formed, in which a vertical plunger bar 7 is reciprocally mounted in adjustable slideway bearings 14 that are attached to the upper side of the table portion 13 of the frame. The lower end of this bar is connected to the upper end of a cam fork 15, the lower end of which engages a cam disk 16 that is secured on the main driving shaft 17 of the machine. The upper end of the plunger bar 7 is provided with a flange 18 that is secured to a block 6 of wood or other suitable material that is made of the size and width of the bottoms of the particular sizes of box that are to be pressed against it. The top surface of this block is covered by a cushion of felt 19 or other suitable material, against which the bottoms of the boxes rest.

Our plunger and size and corner mechanism will partially cover or wrap boxes of from about 3 inches long by one inch wide by one-half inch deep, up to boxes of about 14 inches long by 8 inches wide by 3 inches deep, but each different size of box must have a plunger block 6 that will fit its outside bottom length and width dimensions, as each blank rests centrally on top of this block and each box is fed to rest centrally on the blank and to rest also centrally on the top of the block, which forms a movable support for the blanks and the boxes.

Above this lower plunger block and in vertical axial alinement with it, an upper plunger bar 20 is reciprocally mounted in suitable slideway bearings 21 that are formed in an overhanging bracket arm 22 which is secured to the box frame of the machine. The lower end of this plunger bar 20 is provided with a block 8 which we term a box form, as it is made enough smaller than the box and the block 6 of the lower plunger to fit snugly inside of the boxes.

The boxes are fed automatically centrally over the top of the blanks and in that position the upper plunger's box form descends directly into the box against its bottom and presses the bottom of the box down tight against the blank and against the top of the lower plunger block. The lower plunger with its block reciprocates vertically a short distance and the position in which the lower plunger block first receives the blank and the box shell is the highest point or center of its vertical reciprocal movement. Consequently when the upper plunger form descends into the box against its bottom, it instantly presses it and the blank against the block of the lower plunger, which forms an abutment to the pressure of the form of the upper plunger of sufficient resistance to glue the bottom of the box to the gummed surface of the blank upon which the box rests.

The lower plunger is then drawn down by its cam 16 and is forced down between the side wipers 42, and as these two plungers move down together the upper plunger which is arranged to move slightly faster than the lower plunger bears and consequently crowds down against it and thus holds the bottom with a constant pressure against the top of the lower plunger, and as the lower plunger moves slower on its down stroke than the upper plunger, the upper plunger in order to yield to the slower down movement of the lower plunger, is provided with a coiled spring 23, which is mounted on a bolt 24. This bolt is provided with an eye 25 that is formed integral with the bolt. This eye 25 is loosely mounted on a stud bolt 26 which is threaded into the side of the reciprocal plunger bar 20. The opposite end of the spring provided bolt is provided with a pin 24ᴬ against which a washer 27 bears, and the spring 23 is mounted on the bolt and bears resiliently at one end against the washer and at its opposite end against the under side of one end of an eye bolt 28, that is loosely mounted on the bolt and which is held under adjusted tension on the bolt by two nuts 29 which are screwed down against the eye bolt and enough farther to cause the eye bolt to compress the spring until the eye bolt and the reciprocating plunger bar are under the desired tension. The eye bolt is provided with a threaded stud portion that extends loosely through and is secured by a nut to a lug that forms the terminal end of a lever 30, the opposite end of which is pivotally secured to a yoke 31 that is formed on an arm portion 32 of a yoke-shaped frame 33 which rests on and is bolted to the top table portion of the box-shaped supporting frame of the machine.

The lever 30 is reciprocated vertically by a rod 34, one end of which is provided with a yoke lug 35 which straddles the rod and a pivotal bolt 36 is extended through both the lug 35 and the lever. The lever has an elongated slot 3ᴬ and the pin 36 carries a roller 3ᴮ, which engages the edges of the slot, as the lever is raised and lowered, the said slot permitting the vertical movement of the rod 34, as will be understood. The opposite end of this rod 34, is connected to a lever 37, which is arranged to be engaged by a cam 38, that is formed on a disk 39 which is secured on the main driving shaft 17. This main driving shaft is positioned in the box frame along the base plate and it extends along the center of the width and throughout its length and it is journaled in boxes 40, that are secured to the base plate.

The oppositely arranged side wipers 42 that turn the upper ends of the sides of the gummed blanks up against the boxes are mounted on two stationary cross head brackets 41 that are secured to the top of the table portion of the frame, and they are arranged on opposite sides of the box supporting plungers 7 and 20. These side wipers preferably consist of pieces of wood, the blank engaging faces of which are covered with strips of felt 43 or other suitable material which is glued or is otherwise secured to each wiper. These wipers are removably secured to projections 44 that are formed on cross heads 45 that are slidably mounted in slideways 46 that are formed in the brackets 41. There are two of these brackets, one on each side of the upper and lower plungers, and these two plungers reciprocally carry each box and blank between these side wipers. These side brackets are positioned parallel with the longitudinal length of the box wrapping machine, and are secured to the top of the table portion of the frame. These brackets we term the side cross head brackets. These brackets have a central standard portion 47 and two laterally extending wing portions 48, and they are of such a form that four views, Figs. 34, 35, 36, and 37, are shown of them. They each support one side and two end wrapping mechanisms. The under side of each cross head 45 is provided with a gear toothed rack portion 49, which is engaged by a toothed segment portion 50 that is formed on one end of a rock arm 51. These rock arms are pivotally secured to the brackets 41, and their opposite ends are provided with pivotal eye bolts 51$^A$, through which vertically positioned rods 52 pass loosely. A collar 53 is secured on each rod by a set screw and an expansive spring 54 is mounted on the rod between the collar and the eye bolt 51$^A$. The upper end of each rod is threaded and a collar 55 is pinned to it, which engages the eye bolt 51$^A$ on the downward movement of the rod 52.

The rods 52 extend down through bosses 56 on the brackets 41 and through the table, and rest on the ends of a bar 57, the central portion of which is secured to a vertical plunger 58 that is reciprocally mounted in a slideway formed in a transverse bracket 59, that is bolted to the sides of the frame. The lower end of the plunger bar 58, is connected by a link 60 to one end of a lever 61, the opposite end of which is rigidly secured to a shaft 62, which is mounted in a bearing standard 63, which is bolted to the bed plate. On the shaft 62 are also mounted the outer ends of lever arms 64 and 65, the inner ends of which are provided with rollers, which enter respectively cam grooves in the opposite faces 66 and 67 of a cam disk 68, mounted on the cam shaft 17. Between the arms 64 and 65 and also mounted on the shaft 62 are integrally connected short arms 69 and 70, the inner ends of which are provided with holes, which are in line with corresponding holes in the arms 64 and 65. A hand lever 71 is mounted on the hub portion of the arms 69 and 70, and its forward end is pivotally attached to a locking pin 72, which is slidably mounted in the inner ends of the short arms 69 and 70. The locking pin is of such a length, that when the lever 71 is shifted in the direction of the arrow, the said pin projects through the hole in the arm 70 and into the hole in the arm 65, thus locking the arms 69, 70 and 65 together, while the arm 64 is disconnected from the arms 69 and 70. The arm 65 and its actuating cam face 67 operate in connection with boxes of the ordinary type, while the arm 64 and its actuating cam face 66 operate in connection with boxes having extension bottoms, the respective cam grooves being arranged to that end. Thus when boxes of the usual type are being covered, the arm 64 is not needed, and when extension bottom boxes are being covered, the arm 65 is out of commission. Therefore, when boxes of the usual type are being covered, the short arm 70 is rigidly secured to the shaft 62 by a pin or other suitable means, and when the arm 65 is operated by its cam 67, a corresponding movement is imparted to the short arm 70, which is locked to the arm 65 by the pin 72, and as the arm 70 is rigidly connected to the shaft 62, the said shaft is turned thereby and the arm 61, which is also rigidly attached to the shaft 62, is rocked, and movement is thus transmitted to the plunger arm 58 through the medium of the link 60. The arm 64 will be rocked by its cam 66, but it will perform no function as it is not locked to the shaft 62. Collars 73 are secured upon the lower portions of the rods 52, and between these collars and the lower ends of the bosses 56, are interposed coiled springs 74, which act to depress the rods 52, after they have been raised and then released by the cross bar 57.

The vertical movement of the rods 52 causes their collars to compress the springs 54 and raise the rock arm 51, which causes the toothed ends of the rock arms which engage the rack bar 49 of the cross head 45 to move the wiper blocks against the sides of the blank and box, and hold it there with a resilient tension, as the rods 52 are free to move through the eye bolts 51$^A$ after the side wiper is against the box. Consequently the side wipers bear against the box with a resiliently yielding pressure.

The side wipers as above described are used for wrapping box shells in a manner known as tight wrap work. When however it is desired to wrap box-shells having extension bottoms, in the manner known as extension wrap, the following additional mechanism is added to the side wipers. The sliding block of each wiper mechanism is provided with a pair of horizontally positioned cylinders 75 that depend from it. These cylinders are provided with solid head portions at one end and have nuts 76 threaded into them at their opposite ends. Axial apertures are formed through the heads and nuts, in which stems 77 are reciprocally mounted, and expansive coiled springs 78 surround the stems. The stems are provided with shoulders in the cylinder against which washers 79 rest that receive the thrust of one end of the springs 78 when the stems are moved back through the cylinder by mechanism that is attached to their front ends, and the springs move the stems out forwardly by their expansive tension when the stems are released from backward pressure. A nut is threaded to the outer end of each stem, by which the tension of the spring can be regulated as desired. The outer ends of each pair of stems are threaded into a clip 80, see Figs. 47, 48, and 49, that is provided with a transverse pin 81, upon which is mounted a horizontal rock plate 82, having a depending bifurcated arm 83 in which is mounted a roller 84. This roller is designed to be engaged by one end of a rock arm 85, which is pivotally secured intermediate of its ends to a support 86, which is bolted to the inner face of the bracket 41. The opposite end of the rock arm is connected to a spring 87, which is attached at its opposite end to a pin 88 projecting from the bracket 41. The plate 82 has a forwardly projecting blade 89 secured upon its upper face. The pin 81 has a surrounding coil spring 90, one end of which engages the clip 80 while its other end enters a collar on the end of the pin 81. This spring normally holds the blade and its supporting plate 82 tilted upwardly, in which position it is moved against the box and over its extension lip. As the cylinders 75 move inward with the blocks 42, the roller 84 engages the arm 85, and the plate 82 is tilted and the blade 89 engages the blank and presses it down against the extension portion of the box, the spring 87 affording a compensating movement for the blade against the box, the blades yielding backwardly from it when the cylinders and the block 42 continue slightly farther toward the box to complete their stroke. This arrangement allows the blade to engage the box with a resilient pressure. The roller 84 engages the rock arm 85 as the cylinder moves forward and tilts the plate and its blade downwardly against the tension of the spring 90 so that the blade exerts a downward pressure on the extension lip of the box.

We will now leave the description of the extension wrap mechanism and return to the description of the tight wrap work mechanism.

The next step treatment of wrapping the blank around the box in tight wrap work is performed by the corner wipers 91. These corner wipers are used to wrap the end portions of the sides of the blank around the corners of the box, as shown in Fig. 4, just before the end wipers move into action to wrap the ends of the label against the ends of the box. There are two of these corner wipers for each end of the box, one at each corner, and they each consist of a plate 91, which is provided with lugs 92, which are pivotally secured to a block 93 by a pin 94.
This pin is extended beyond the lugs and a coiled spring 95 is mounted on it, one end of which is secured to a collar 96 on the lower end of the pin and the other end of the spring is secured to the adjacent lug 92.
Each block 93 is tiltingly secured to the end of a toothed rack bar 97 by a pin 98 and this block is also tiltingly secured by a pin 99 to a similar rack bar 100. The two bars 97 and 100 are mounted parallel to each other in a slideway bracket 101 that is adjustably secured in slots 102 that are formed in each end portion 48 of the bracket 41 by bolts 103, there being two sets of these corner wipers for each side corner of the box. Each toothed rack bar 97 is engaged by a gear 104 that is provided with side trunnions that are mounted in bearings that are formed in the sides of the slideway bracket 101. Each bracket 41 is provided with bearings 105 at its ends, in which are mounted square shafts 106 having round bushings which turn in the said bearings 105, and upon the respective shafts 106 are slidably mounted the gear wheels 104, two gear wheels being on each shaft. The gear wheels occupy the position shown in Fig. 6, or in other words mesh with the toothed bars 97, when tight wrap boxes are passed through the machine, and for loose wrap boxes, the gears 104 are shifted to engage the toothed bars 100. The gears have short trunnions, one of which enters the opening in the adjacent side of the slideway bracket 101 when the gear is in mesh with the toothed bar 97, while the other trunnion enters the opening in the other side of the bracket 101 when the gear is in mesh with the toothed bar 100. The slideway is formed with a central partition web 107, which separates the toothed bars 97 and 100, the said web having a semi-circular recess to permit of the lateral shifting of the gear wheels 104. When the outer end of the partition web of each slideway is secured, a blade spring 108 having a curved portion, which, when the gear wheel 104, is in mesh with either of the toothed bars 97 or 100, is adapted to bear upon the adjacent trunnion of the said gear wheel, and thus prevent lateral shifting of the same, as will be understood by reference to Fig. 46. Each of the square shafts 106 is rotated by a gear 109 that is mounted on its forward end and which is driven by a vertically disposed toothed rack portion that is formed on a bar 110 that is slidably mounted at its upper end in slideways 111 that are formed in the adjacent ends of the cross head bracket 41. The lower end of this rack bar is adjustably secured to a vertically reciprocating cross head bracket 112. The slots 113 in the lower end of the rack bar when it connects with the ends of the reciprocal cross head bracket permit of vertical adjustment of the rack bar.

The reciprocating bar 97 is moved by a slight throw movement of the vertical upstroke of the cross-head 112 and the vertical rack bar 110 and by its pinion 109 and the pinion 104, against the corner of the blank and the corner of the box, which throw movement is sufficient to tiltingly compress the wiper against its abutment spring as the wiper moves against and over the corner of the box against its adjacent corner and edges with sufficient resilient pressure to firmly glue the corners of the table to the corners of the box. After the corner wiper has pressed the corner of the blank against the corner of the box, it is thrown back away from the box by the frictional engagement of the sliding bar 100 with its slideway, which acts to accomplish this throw movement of the wiper in the following manner: The spring 95 normally holds the wiper in the position shown in Fig. 43, but the block 93 is slightly tilted on both its inward and outward movement by the frictional engagement of the tooth bar not operated by the gear 104, with its slideway. In the present instance, the bar 97 is engaged by the gear 104, and the bar is moved outward or away from the box. The pull on the bar by the gear wheel will cause the block to tilt outward or away from the corner of the box, owing to the consequent dragging movement of the bar 100 upon which an indirect pull is exerted. Thus when the block 93, and its wiper 91 start forward or toward a box, the wiper is thrown out slightly, but the initial movement of the bar 97 tilts the block 93, owing to the indirect pull on the bar 100, and consequently the wiper 91 is pressed against the end of the box. The pinion thus causes the corner wiper to tilt against the box as the wiper starts across the end corner of the box, and the bar not operated by the gear 104 causes the wiper to tilt away from the box after it has completed its corner label wrapping stroke. The reciprocating cross heads 112 reciprocate the rack bar 110 that rotates the pinion and shaft that through the medium of the gear 104 reciprocates the bar 97, which moves the wipers to and from and across the surface of the corner ends of the box, at all four of its corners, and leaves the ends of the blank glued to the ends of the box as shown in Fig. 54.

The next step treatment and the final one of wrapping the blank around the box is given by the end wipers 113 which act simultaneously against the opposite ends of the label and wrap them up against and glue them to the opposite ends of the box.

The end wipers 113 are designed to engage the central portions of the ends of the blanks and wipingly press them up against the ends of the box shell, and as they do this they fold and press the ends of the blanks over the corners of the blank, which have just been glued to the corners of the box shell by the corner wipers. The box shell is carried down between the side and corner wipers, but the end wipers move upward against and over the ends of the opposite ends of the box shell. These end wipers each consist preferably of a piece of wood 114, the upper edge of which is rounded back to enable it to move smoothly against the blank. Each of these wooden end wipers has its blank engaging face covered with a strip of felt 115 and each wiper is clamped to a step of a sliding block 116 by a cap 117 and a bolt 118. The sliding block 116 is slidingly mounted in a T slot that is formed in the top of a head block 119 that is pivotally secured by two pins 120 to one of the ends of two reciprocating bars 122 and 123. Each of these bars is reciprocally mounted in slideways formed in a bracket 124 which is adjustably mounted upon a slotted plate by a bolt 125. This slotted plate 12$^A$ is slidably mounted in the table top 13. The vertical rack bar 122 of each end wiper is reciprocated as follows: A pinion 126 is provided with trunnions which are rotatively mounted in bearings 127 formed in the brackets, and a square shaft 128 is extended loosely through the pinions of both brackets. This shaft is provided at its outer end with a pinion 129 that meshes with a rack bar 130 which is slidably mounted in bearings 131 and 132 that are formed on a bracket 133, which is secured to the end of the table. The lower end of this rack bar 130 is connected to one end of a reach rod 134, the opposite end of which is connected to the upper end of a forked lever 135, the opposite forked end of which straddles the main shaft. This lever is provided with a roller 136 that engages a cam 137 which imparts a reciprocal movement to said rack bar, and rotates the pinion, which turns the square shaft and the pinions 126 that raise the rack bars 122 which tilt the head blocks 119 on their pins 120 and cause their wipers 114 to tilt against the adjacent end of the blank and box, the instant the rack bars 122 are started upwardly by the pinions 126. Each tilting block tilts on the pin 120 toward the box, which throws the wiper 114 against the box and the tilting of the head block is accomplished by the dragging action of the bar 123, which is held in its slideway by a friction pressure which may be applied to it in any suitable manner but which I preferably create by a friction button 138 which is mounted loosely in the bracket and is held by a spring 139 against the said bar 123 with sufficient adjustable pressure to cause the bar to fit tight enough to hold the tilting block down in its tilted position. The pinions as they are rotated by the square shaft raise the rack bars and cause the wipers 114 to rubbingly bear against the end of the blank and box and to move upwardly across its adjacent ends to its tip edge, and thus firmly glue the blank to the box over the top of the corners of the blank that were just an instant before glued to the corners of the box. The end wipers bear against the ends of the box with a resiliently yielding pressure, which is imparted to each of them by an expansive spring 140 which is mounted on a pin 141 that is extended loosely through an arm 142 formed on the head block 119, and is threaded into the sliding block 116. The forward throw stroke of the head block 119 is greater than that necessary to move the wiper against the box so that the block 116 slides on the head block 119 after the wiper has been moved against the end of the box. Consequently the sliding blocks 116 press the ends of the blanks with a yielding pressure against the opposite ends of the box. The instant the wipers have moved up over the ends of the box, the cam 137 reverses the movement of the rack bar 130 and the direction of the rotary movement of the pinion 129, causing the rack bars 122 to move downward and at the instant they start down they pull down on the pins 120, which cause the head blocks to tilt on their pins 120 of the bars 123 and this tilting movement of the blocks on their pins causes the wipers 114 to move far enough away from the ends of the box to entirely leave the same for about a sixteenth of an inch, and the friction bars 123 hold the tilting blocks in that position as they bear with a friction fit in their slideways tight enough to cause the rack bars to have to pull down on the head blocks with a sufficient pressure to hold the blocks in their thrown back position away from the end of the box.

The end wipers are adapted to effect extension lip wrap work by means of a spring 143 which is housed in a cup 144, which is bolted to the bracket 133. A rod 145 extends through this cup and its lower end is threaded and provided with nuts which strike the bottom of the cup and define the stroke of the rod. The upper end of this rod engages the under edge of an arm 146 that is secured to the side of the rack bar 130. The spring 143 is an expansive compression spring and its lower end rests against the bottom of the cup 144 while its upper end bears against a cap 147 that is slidably mounted in the cup and is secured to the rod 145.

The arrangement of the rack bar 130 with respect to the reach bar 134, as shown in Figs. 2, 4, 5, and 6, is for wrapping ordinary boxes or such as are not provided with extension bottoms. The rack bar 130 is provided at its lower portion with a slot 148 and a block 149 is bolted to the upper end of the bar 134, and is provided with a recess in which rests the lower end of the rack bar 130, and the bar is held within the recess by a cap 150. A pin 151 passes through the lower end of the rack bar 130 and bears against the lower end of the block 149, and an adjustable block 152 bears against the upper end of the block 149, and is secured to the rack bar 130 by a bolt 153 which passes through the slot 148. Thus arranged, the cam fork 135, the reach bar 134 and the rack bar 130 move in unison as will be understood, and with these parts thus arranged, as shown by Fig. 6, the end wipers are raised high enough to accomplish the end wiping of boxes of the greatest depth for which the machine is set. In wrapping boxes of less depth, however, the rack bar 130 must have a shorter stroke in order to diminish the rotative travel of the gear wheels 126, and to accomplish this, the adjustable block 152 is moved up a suitable distance above the block 149, and is firmly clamped to the rack bar by its bolt 153. Thus the movement of the cam 137 will raise the reach bar 134 a short distance before the block 149 engages the block 152, after which the rack bar and reach bar move up in unison. It is necessary however that the rack bar should start to move upward simultaneously with the reach bar and move far enough to raise the end wipers 114 from the positions shown in Fig. 6, to a position where their under sides are on a plane with the upper face of the lower plunger; and this is accomplished by the spring 143, which lifts the rod 145, the upper end of which engages and exerts an upward pressure against the projection 146, on the rack bar 130, by which the pin 151 in the lower end of the rack bar is held in engagement with the block 149 of the reach bar, and the rack bar, through the action of the spring 143, moves up with the reach bar, until the nuts 5ᴬ on the end of the rod 145, engage the bottom of the housing 144, and the further action of the spring is thereby checked. After a momentary pause, during which when extension bottom boxes are being covered the end wipers are moved in toward and against the ends of the box, the cam again begins to raise the reach bar, and moves it until the block 149 engages the adjustable block 152, when the rack bar will then be raised far enough to complete its operation, being moved a distance corresponding to the depth of boxes passing through the machine. As the rack bar 130 descends, its projecting arm 146 engages the upper end of the rod 145 in the housing 144, and the spring 143 is compressed and the rod 145 depressed to the position shown in Fig. 5.

In extension bottom box work, it is necessary that the end wipers 114 should move up until their under sides are on a level with the upper face of the box bottom, and then move inward against the ends of the box a distance equal to the width of the extension, and this is accomplished in the following manner: The racks 122 move the blocks 114 upward until the blocks are flush with the top edges of the extension bottom, then the racks reverse and tilt the block 114 and instantly thereafter the cam 68 works through levers H, G, and 11$^J$, and rod 11$^G$, which causes blocks 114 to move inwardly over the extended edges of the box. Then rack bars 122 move upward again, tilting the blocks 114 into corner of extended edges and upward, wiping the end of the blank against the box. The inward movement of the end wipers against the ends of the box is accomplished in the following manner:

The head blocks 124 are adjustably secured to the slotted plates 12$^A$, which have a sliding movement in the table, and each plate 12$^A$ has a depending bifurcated lug 11$^A$, at its outer end, to which one end of a link 11$^B$ is pivotally secured, and the other ends of these links are connected to levers 11$^C$ and 11$^D$, which are rigidly secured upon shafts 11$^E$ and 11$^F$ respectively, which are mounted in the sides of the table. The lever 11$^C$ is a bell crank form of lever, and its other member is connected to the upper end of a rod 11$^G$, the lower end of which has a collar 11$^H$ secured thereon; a coil spring H$^2$ surrounds this end of the rod and bears against the collar 11$^H$, and the upper end of this spring bears against an eye bolt 11$^J$, which is secured in the end of one arm G, of a double armed lever, the other arm H of which carries a roller J, which is adapted to be engaged by a cam on the peripheral edge of the cam disk 68. The double armed lever is mounted on a stationary shaft K, which projects from a bracket L, that forms an integral part of the cap of the adjacent bearing standard 40. The shaft K extends beyond the hub of the double armed lever and upon its outer end a collar M is rigidly secured. A coil spring N is mounted on the shaft between the collar and the hub of the double armed lever, one end of said spring entering a hole in the collar while its opposite end enters a hole in the hub of the lever, the spring being under a tension that will hold the roller J in contact with the periphery of the disk 68. The outer ends of the shafts 11$^E$ and 11$^F$ carry respectively levers O and P, the lever O extending upward, while the lever P extends downward, and the ends of these levers are connected by a rod R.

Thus when the cam on the disk 68 passes from under roller J, the spring N forces the double armed lever downward, and the rod 11$^G$ is drawn upon, and the shaft 11$^E$ is given a partial rotation by the bell crank 11$^C$, the other member of which draws on the link 11$^B$ and moves the slotted plate 12$^A$ inward. Simultaneously the lever O on the outer end of the shaft 11$^E$ draws on the rod R, and the lever P at its other end partially rotates the shaft 11$^F$, in an opposite direction to the shaft 11$^E$, and the lever 11$^D$ on the shaft 11$^F$, draws on its link 11$^B$ by which the other slotted plate 12$^A$ is moved inward. As the plates 12$^A$ carry the head blocks 124 which support the wipers 114, it will be readily seen that the said wipers will be moved toward each other against the ends of the box, and with a resilient contact effected by the spring H$^2$. The eye bolt 11$^J$ on the reverse movement of the lever arm G engages a collar S, which is pinned to the rod 11$^G$, and thus the rod is lifted, and the outward movement of the end wipers effected.

The opposite end of the shaft 11$^F$ from the lever P carries a stop finger T (see Fig. 1), which when the wipers are moved to the desired point, or in contact with the ends of the box, strikes against the end of an adjustable screw U, which is threaded to a lug on the side of the frame, and any further movement of the lever arm H is against the spring H$^2$, the wipers not being effected thereby.

In boxes of the usual type, or such as have not extension bottoms, the inward movement of the wipers is not required, and to prevent this inward movement of the wipers, the screw U is screwed down until its end engages the stop finger T, which will prevent rocking of the shaft 11$^F$, and likewise of the shaft 11$^E$. The arm G of the double armed lever will however be moved just the same through engagement of the roller J with the cam disk 68, but the movement of the arm G will be against the spring H$^2$ and the rod 11$^G$ will not be effected thereby.

In the character of box wrapping work with blanks known as loose wrap work, the same arrangement of wipers is used as for tight wrap work, as the blank which does not contain any adhesive gum except along its outer edge portions has to be wrapped around the box just the same, and the gluing of the edges of the blank to the inner edges of the box takes place in the second stage treatment portion of the machine.

The ends of the loose wrapped blanks are so tightly folded and pressed against the ends of the box by the end wipers that they remain close enough to the ends of the box (although they are not in any manner glued to the ends of the box) to allow the turn-in end wipers to move down over them without touching them immediately after the box is moved against the stop arm at the second stage station, and the instant after the end turn-in wiper that is nearest to the first stage station moves the box with its box engaging and holding block into the turn-in wrapping station of the second stage treatment station and the box is moved into this wrapping station, the end wipers engage the loose ends of the blanks and carry them against the ends of the box and then continuing their movement, bend the upper free end of the ends of the blank over the edges of the ends of the box into its interior so that it stands at an angle of about 20 degrees, where they leave them, withdrawing from them. The side turn-in wipers then operate, and afterward the box holding plates descend and seat the box against the top of the table and then the vertical wipers descend and push the gummed ends of the blank down into the interior of the ends of the box and against its inside surface, the operation being identical to that of the end turn-in mechanism of the tight wrap box wrapping.

The two plungers after they have held the box between them until the blank has been wrapped around the bottom, sides and ends of the box, separate and the upper plunger moves rapidly upward out of the box. This upper plunger however is provided with a box stripper 154 which remains in the box and holds it down against the top of the lower plunger 6 until the upper plunger moves up out of the box. This stripper comprises a blade 154 which fits in a recess 155 formed in the under side of the plunger 8, and it is arranged and operates to hold and release the box as follows:

To the center of the blade the lower end of a rod 156 is secured, which extends up through a slideway formed in the head block A of the arm 22, and the upper end of it is connected to one end of a coiled spring 157, the opposite end of which is connected to the upper end of the plunger bar 20. One edge of the rod 156 of the stripper is provided with a notch 158 which engages and locks to an L-shaped latch 159 that is slidably mounted on top of the head block A of the fixed arm 22. This latch is provided with a spring 160 that normally holds it against the side of the rod with sufficient resilient pulling pressure to cause it to jump into the notch 158 of the rod when the rod is moved down with the plunger's bar 20. The spring 157 of the rod is arranged with sufficient contractive tension to normally hold the stripper blade up into its recess in the bottom of the plunger. Consequently it moves down with the plunger and rests inside of the bottom of the box when the plunger moves down against the bottom of the box and presses it down against the top of the bottom plunger, and the notch 158 in the rod is so relatively positioned to the spring latch that when the plunger is down tight in the box and against the top of the lower plunger it locks the rod 156 of the stripper to the stationary head of the fixed arm 22, with the lower edge of its blade resting against the bottom of the box. Then when the plunger starts upward the stripper stays down in and holds the box against the lower plunger. This upward movement of the plunger and its bar stretches the spring 157 of the stripper until the stripper is released from its latch. This is accomplished by a cam 161 which is secured to the side of the plunger bar in a position to engage a roller 162 on the latch when the plunger has moved out of the box, and move the latch out of the notch of the stripper's rod, which then releases the stripper and allows the contractive tension of the spring 157 which has been stretched out by the upward travel of the plunger's bar to jerk the stripper up into its recess in the plunger, thus fully releasing the box from the action of the upper plunger and leaving it resting loosely on top of the lower plunger, as all of the blank wipers after wrapping the blank against its sides and ends move back a short distance from it. Consequently the box wrapping action of the first stage treatment station of our box wrapping machine is completed.

The box is then engaged by a transfer mechanism which strikes its outer end and pushes it into engaging relation with the blank wrapping mechanism of the second stage treatment station of our box wrapping machine.

This box transfer mechanism may consist of either a pneumatically operating mechanism or of a number of mechanically operated mechanical members. Our invention however contemplates the use of either mechanism.

The pneumatic transfer mechanism consists of a cylindrical tube 163 having closed ends. This tube is clamped in a split hub 164 that is formed on the vertically projecting bracket 133 that is secured to the end of the table portion of the frame. This outer tube is provided with an air inlet nipple 165 at its rear end, and with vent apertures 166 and 167, at its front end portion. This tube is also provided with a packing washer 168 that lies against its front head. Within this outer tube a second tubular member 169 is slidably mounted, which projects through the front head 170 of the outer tube. The outer end of the inner tube 169 is closed by a head end portion 171 while its inner end is open to the air inlet of the outer tube. Within this inner tube a piston head 172 is slidably mounted, and a plunger rod 173 is secured to the piston head. The outer end of this plunger rod is provided with a disk 174 that strikes the end of the box when the plunger is thrown out by the air pressure. When the air pressure is forced into the outer tube from the air pump 175 through the tube 176 the inner tube and the plunger head and rod are shot out to the end of their full lengths, which is sufficient to enable the plunger to engage the box and move it against a stop 177 at the end turn in mechanism of the machine.

The air pump 175 comprises a suitable cylinder having a piston and rod 7^A connected therewith, the upper end of which is pivotally attached to one end of a lever 7^B, the opposite end of which is pivotally mounted upon a bracket 7^C, which also supports the lever 37. The lever 7^B is provided intermediate of its length with a roller which enters a cam groove in the opposite side of the cam disk 39 from that which operates the lever 37, whereby the said lever 7^B is operated to effect the movements of the piston of the pump 175.

If it is preferred to use a mechanical means for moving and transferring the box, a casing 178 is connected to the bracket, which houses a rack bar 179 and a pinion 180, and the outer end of the rack bar is provided with an adjustable plunger 181 that can be secured in adjusted positions to compensate for the distance large and small boxes are to be moved to engage the stop. The supporting shaft 182 of the pinion is provided with a bevel gear 183 that meshes with a bevel gear 184 which is mounted on one end of a rod 185, the opposite end of the rod being provided with a pinion 186 which meshes with a gear 187 that is mounted on a shaft 188, to the opposite end of which a spur gear 189 is secured. A gear toothed segment 190 meshes with the spur gear. This toothed segment 190 is formed on one end of a rock bar 191 which is pivotally supported intermediate of its ends in a suitable manner. The opposite end of this rock arm is provided with a roller 192 which engages a cam groove that is formed on a disk 193 that is mounted on the main driving shaft. The rod 185 and shaft 188 are supported by bearings that are formed in brackets, not shown, which are secured to the frame of the machine. The cam and the gearing reciprocate the rack bar, the plunger of which on its forward movement strikes the box and moves it against the stop arm 177. This stop member comprises an arm that is pivotally mounted on a pin 194 which passes through to a support or carriage 195 which is mounted on a slideway 196 that extends longitudinally of the length of the machine to its discharge end, commencing adjacent to the first stage mechanism and extending under the second and third stage mechanism but below the level of the top of the table to which it is secured at its ends and at intermediate points. This slideway 196 is provided along its opposite sides with projecting slide rails 197 and the carriage is arranged to straddle the under side of the slideway 196 and fit slidably on and over the rails 197, the said rails being of a length to permit the carriage to be adjusted to bring the stop arm 177 in position to engage boxes of different lengths.

The carriage 195 as illustrated is positioned below the side and end turn in mechanisms of the second stage section of the machine, the stop arm 177 being in a position to stop the largest size boxes the machine will wrap.

The side and end turn in mechanisms are also set to receive the largest size boxes the machine will wrap. In order to move the carriage 195 and its stop arm to stop smaller sized boxes down to the smallest size the machine will wrap, we provide a hand operating threaded rod 198 which is rotatably threaded to the carriage, while its outer end is rotatively mounted in a bearing 199 formed on the cross rib 200 of the adjacent end of the table. A hand grasping knob 201 is mounted on the outer end of the rod, which is so arranged in its bearing that when it is turned by hand the bracket and arm are moved along the rails 197 of the slideway 196, to the required point relatively to the length of boxes being covered.

The longitudinal center of the second stage station of the machine is defined by a vertical arrow (Fig. 26) and all adjustments of the box wrapping and transferring mechanisms for different sizes of boxes at this second stage station are made relative to this point as the center of the length of the box being wrapped at this station.

A slot 202 of suitable length is formed in the bottom of the slideway 196. A spur gear 203 is loosely mounted on a cross shaft 204 that extends across and is secured in bearings in the sides of the table. The spur gear projects up into the slot 202 and meshes with a toothed rack bar 205 which we term the box shifter rack, and which is mounted in the slideway 196. The gear wheel 203 has a pinion gear 206 rigidly secured thereto in any suitable manner, and this pinion meshes with a toothed bar 207, the lower end of which is bolted to a forked lever 208, which straddles the main shaft 17, and is provided with a roller which enters a suitable cam groove in a cam disk 209, which is mounted on the main shaft. The upper end of the toothed bar 207 passes through a guideway 210, which is rigidly secured to the shaft 204. This box shifting rack bar is provided with a centrally projecting flange 211 which extends throughout its full length. This box shifting rack is held in the slideway 196 by caps 212 which are screwed to the top edges of the slideway. To the flange above these caps two clips 213 are secured, that project above the flange and form bearings for the opposite ends of a right and left hand threaded rod 214. Upon the opposite ends of the threaded rod 214, blocks 215 are threaded, the upper ends of which are bifurcated to receive the lower ends of gripping arms 216, which are rigidly mounted upon pins 217, which are pivotally mounted in the bifurcated ends of the said blocks, their ends extending beyond the sides of the blocks. Upon one end of each of the pins 217, is rigidly mounted an arm 218, the arms extending in opposite directions, and upon the outer end of each arm is mounted a roller 219. Upon the opposite end of each pin is secured a nut or washer 220, and a coil spring 221 is mounted on the pin between the nut and the block 215, one end of which enters a hole in the nut and its other end enters a hole in the block, these springs being under tension which is exerted to raise the arm so that their outer ends, which are upturned, will extend a slight distance above the plane of the table. The lower ends of the blocks 215 are also bifurcated, and are slidably mounted on the flange 211 of the rack bar 205.

These box gripping arms 216 have their upper ends arranged to stand vertically upright when at the limit of their upward movement, and these upper ends are adapted to move against and grip the opposite ends of each box, at the second stage station, with sufficient pressure to hold it and move it to the third stage station, as will be hereinafter described.

The outer end of the threaded rod 214 is provided with a transversely positioned pin which with the terminal end of the rod is adapted to receive a hand operated socket wrench by means of which the threaded rod may be turned and the blocks 215 moved toward or away from each other to grip any size box from the smallest to the largest; as illustrated they are shown arranged to grip the largest size box the machine will wrap. These box grippers are moved down out of the way of each box as they deliver it to the third stage station, by a longitudinal bar 222, the upper edge of which terminates in a horizontal lip 223, which at all times engages the rollers 219 on the arms 216. The opposite ends of the bar 222 are pivotally attached to levers 224 and 225, respectively, the opposite end of the lever 225, being loosely mounted on a threaded rod 226, which extends transversely across the table and is mounted in bearings in opposite sides of the frame. One end of this rod is provided with a crank handle 227, by which the rod may be turned to effect the adjustment of the side-turn-in mechanisms, as will be hereinafter described. The lever 224 is mounted midway of its length upon a stationary shaft 228, which extends transversely across the table and is supported in the sides thereof.

The opposite end of this lever 224 is pivotally attached to one end of a connecting rod 229, the opposite end of which is pivotally connected to a lever 230, which is mounted midway of its length upon a stationary shaft 231, also supported in the side frames of the machine. The opposite end of the lever 230 carries a roller 232 which is engaged by a cam 233 on the circumferential edge of a disk 234, which is rigidly mounted on a shaft 235, which is supported in bearings in the side frames of the machine. The roller 232 is held against the edge of the cam disk 234 by a coil spring 23$^A$, which surrounds the shaft 231, and is attached at one end to the lever 230 and at the other end to a collar on the said shaft. This shaft carries a bevel gear wheel 236, which meshes with a similar gear 237 on the adjacent end of the main shaft 17.

As the disk 234 rotates, the cam 233 engages the roller 232, thereby rocking the lever 230, by which the rod 229 is drawn upon and the lever 224 rocked, its upper end being raised together with the upper end of the lever 225, which moves in unison with the lever 224, through its connection with the bar 222. This movement of the levers 224 and 225, raises the said bar 222, the lip 223 of which engages the rollers 219 on the arms 218, which, with the grippers 216, are permitted to rise to the position shown in Fig. 26, the cam 223 being timed to effect the raising of the bar 222, to allow the grippers 216 to engage each box after the second stage treatment has been accomplished, and to advance the box to the third stage.

The rear end of the rack bar 205 has secured thereto an upright 238, which is similar to the blocks 215, and this upright supports a box discharging arm 239, rigidly mounted on a pin which passes through the upright and carries at one end an arm 240, similar to the arms 218, and which is also provided with a roller similar to the rollers 219 on the arms 218. The arm 240 is also actuated in one direction by a spring similar in all respects to the springs 221, which raise the arms 216. The roller carried by the arm 240 is in continuous engagement with the lip of the bar 222, and the discharging arm 239 is, therefore, actuated simultaneously with the gripper arms 216.

It will thus be seen that at each rearward movement of the rack bar a box is transferred from the second stage position to the third stage position by the grippers 216 and the box which was in the third stage position is caught by the arm 239 and discharged from the machine.

These box grippers are positioned in the longitudinal slot of the top of the table above the stop lever 177, and the stop lever cannot move up to stop a box coming to the second stage position from the first stage position except when the box shifting grippers are in the third stage position. Consequently when a box has received the side and end wrapping of the first stage station, it is shot against the end of the stop 177 which is illustrated in position to receive it, and has received it, and the box is shown against it in dotted lines, Fig. 1.

The box is then moved forward one inch into position to have its upper ends turned in and wrapped against the inside of the box. At the time the box is engaged by the front, end-turn-in mechanism and its forward movement of about an inch against the rear bend block 12 has commenced, the stop arm 177 is swung down away from the box by its operating mechanism, which is constructed and arranged as follows:

The carriage 195 is provided with a depending portion in which a vertically arranged rack bar 241 is mounted. The gear teeth of this rack bar engage a pinion 242 that is mounted on the supporting pin 194 of the stop arm. The lower end of this rack bar is provided with a shoulder 243 which is adapted to be engaged by a longitudinal lip 244 on a horizontally positioned bar 245 which is secured to the upper end of a bar 246, the lower end of which is secured to a reciprocating cam fork 247, the lower end of which straddles the main driving shaft 17, and is provided with a roller which engages a cam 248 that is secured on the main driving shaft. The cam 247 is timed to draw the bar 246 and consequently the bar 245 down, at the instant the rack bar 205 moves forward to bring the grippers 216 to the second stage position, and as the lip of the bar 245 engages the shoulder 243 on the rack bar 241 and depresses the said rack bar, its engagement with the gear wheel 242 causes the same to turn the shaft 194 upon which the stop arm 177 is rigidly mounted, and the said stop arm is turned down to the position shown in full lines in Fig. 26, and in dotted lines Fig. 28. The upper end of the rack bar 241 terminates in a horizontal arm 249 which is engaged by a longitudinal flange of the rack bar 205, as the said rack bar moves forward and the stop arm 177 is thus held down until it is released by the rack bar 205 on its rearward movement. The stop arm 177 is thrown up by a coil spring 250 which surrounds a projecting end of the pin or shaft 194, upon which the stop arm is rigidly mounted. One end of this spring enters a hole in the adjacent side of the carriage, while the other end thereof enters a hole in a collar 251 which is secured upon the adjacent end of the pin 194, the tension of the spring causing the stop arm to swing to the position shown in full lines in Fig. 28, when it is in position to stop a box. After drawing the rack bar 241 down, as previously described, the cam 248 raises the bar 245 to the limit of its upward movement, as shown in Fig. 27, when its lip 244 is ready to again engage the shoulder 243 on the lower end of the rack bar 241, when the same is released by the rack bar 205 and thrown upward by the spring actuated gear wheel 242.

The box is now in the second stage treatment position and it is engaged and operated on as follows:

This second stage treatment of the blank acts to turn in the vertically projecting upper ends and sides of the blanks that are left standing above the box at the completion of the first wrapping treatment at the first stage station. The first of the second stage treatment steps commences immediately after the box comes to a stop against the stop arm, and the stop arm is lowered out of the path of the box. Then the forward end of the box is engaged by a push block that is clamped on the lower ends of the head block B. There are two of these head blocks B and C and they have a vertical reciprocal movement of sufficient stroke to raise above and to drop down behind the box, the head block B first pushing it forward against an abutment block formed on the lower end of the opposite head block C, where it is gripped tightly between the members 11 and 12 of the blocks. The box is then first pressed down and is firmly seated against the top of the table portion of the frame by a downward vertical movement of the plates 310 of the end turn in mechanism, which will be presently described.

The turning in of the ends of the blank into the ends of the boxes is accomplished by two different and independent operations of the end turn in mechanism and the side turn in mechanisms operate in between the two actions of the end mechanism, and we will first describe the first action of the end turn in mechanism. We will state however that at the time the box is being pushed forward against the abutment block 12 the first step treatment of turning in the ends of the blanks is performed automatically as follows:

The box end blank turning in mechanism comprises two vertically positioned head blocks B and C which are arranged to face each other.

The end turn in mechanism C is fixed relative to the frame of the machine, while the end turn in mechanism B has a short reciprocal horizontal movement by which it engages and moves the box against the abutment block 12 of the turn in mechanism C. After the box has been moved by the movable head block against the fixed head block, it is gripped and held rigidly until the edges of the projecting vertical edges of the blank are completely wrapped in the box. The two head blocks B and C are supported by and depend from an overhead arm 253 which is positioned above the table over its center and extends longitudinally along its entire length from adjacent to its first stage mechanism. This arm has a short vertical reciprocal movement that is imparted to it by a cross head 254 that is raised and lowered by a cam 255. This cross head comprises two cylindrical hub members 256 which are connected by a bar 257 having a central opening 258. Within the hubs are secured the lower ends of two tubular vertical hollow standards 259, the upper ends of which are secured in hub portions 260 of the overhead arm 253 by pins 261 which pass through the said hubs and through the standards. The opening in the bar of the cross head receives a worm gear 262 through which the threaded upper end of a circular bar 263 passes, the lower end of which is secured to a cam fork 264 having a roller which enters a groove in the cam disk 255, and in this manner the cross head and the overhead arm are raised and lowered for a purpose to be hereinafter explained. Upon the hub portions of the cross head are bearings in which is mounted a horizontal shaft 265 having a worm pinion 266 which meshes with the worm gear 262 carried by the cross head. The outer end of this shaft 265 carries a hand wheel 267, by turning which the worm pinion 266 is caused to turn the worm gear 262 in the cross head 254 whereby the threaded rod 263 may be lengthened or shortened to suit the depth of various sized boxes.

The overhead arm is provided with a fixed slideway bar 268 that is secured to its bottom in position to receive the head block C, and with a slideway bar 269 that has a short reciprocal movement, it being slidably mounted on bolts 270, which extend through the arm. The head block C is adjustably mounted on the slide bar 268 and it is secured thereon by a set screw 271 in a position to receive each different size box that the machine will wrap.

The head block B is also adjustably mounted on the movable slideway 269 and is secured thereon in adjusted positions by a set screw 272. Both head blocks are provided with guideways 273 that straddle their slideway bars, and are secured over the side edges of the slideways by cap strips 274 that are secured to their opposite sides. As illustrated these head blocks are positioned on their respective slideways in positions to receive between them the largest size box the machine will wrap. The reciprocating slideway bar 269 is provided with a number of gear teeth which are engaged by a pinion 275 that is mounted on a stud screw 27ᴬ that is threaded into the side of the overhead arm 253. This pinion 275 also meshes with the teeth of one end of a rack bar 276 that is mounted in a slideway 277 that is formed in the overhead arm. The opposite end of this rack bar is also provided with gear teeth that mesh with a gear 278 that is mounted on the end of a short shaft 279 that is suitably journaled in a vertical bearing 280, on the overhead arm. The upper end of the shaft 279 is also provided with a gear 281 that meshes with the teeth of one end of a rack bar 282 that is slidably mounted in a suitable bearing 283 secured upon the overhead arm. The opposite end of this rack bar is also provided with teeth that mesh with a gear 284 which is preferably brazed upon the top end of a square tubular shaft 285 that surrounds loosely a solid square shaft 286. The upper end of this square solid shaft is rounded and passes loosely through the gear 284, the solid shaft having a shoulder at the junction of its round and square portions, which bears against the gear 284. This square tubular shaft extends down through the frame and passes loosely through a gear 287 that is rotatably mounted in a suitable bearing on the frame in which the gear is supported against vertical movement. A rack bar 288 is reciprocally mounted in the frame and its gear teeth mesh with the gear 287. The opposite end of this rack bar is pivotally connected to one end of a link 289, the opposite end of which is connected to one arm 290 of a double armed lever, which is pivotally mounted in a journal block 291, that is secured to the bed plate of the frame. The upper end of the other arm 292 of this double armed lever is provided with a roller which engages a groove in one side of a cam 293 that is mounted on the cross shaft 235. This cross shaft has secured upon it the bevel gear 236, which meshes with and is driven by the bevel gear 237 that is mounted on the end of the main driving shaft. The lower end of the solid shaft 286 passes loosely through a gear 294 which is mounted in a bearing 295 secured to the adjacent side of the frame. The gear 294 is in mesh with a rack bar 296, the opposite end of which is connected to a link 297, the other end of which connects with one end of a lever 298, which is loosely mounted on the stationary shaft 231. The intermediate portion of this lever carries a roller, which enters a groove in the opposite side of the cam 293.

The upper end of the solid square shaft 286 carries a gear wheel 300, the function of which will be hereinafter set forth. The rack bar 296 has a bend, as shown, so as to pass the circumferential edge of the cam 209. A duplicate of the cam 293 is secured upon the opposite end of the shaft 235, which operates a duplicate arrangement of the levers and rack bars just described, which rack bars operate a duplicate arrangement of the gears 287 and 294 and shafts 285 and 286. The upper ends of the right hand hollow shaft 285 carry a gear wheel 301, and the upper end of the right hand solid shaft 286 carries a gear wheel 302, the function of which will be hereinafter described.

Each head block is provided on its right hand side with a worm pinion 303 which is rotatably mounted in bearings formed on the side of each block. Each worm pinion of each head block meshes with a toothed segment 304, that is secured on one end of a pin 305, which is pivotally secured in the head block. A depending lever 306 is rigidly secured upon the pin, the lower end of which is arranged to engage a pin 307, which extends loosely through a long slot 308 formed in each block, and also through a slot 309 that is formed through a plate 310 that is reciprocally mounted in a slideway 311 that is formed in the outside edge of the head block, said pin being threaded into a finger blade or bar 312 which is seated in a slot formed in the outside surface of the plate 310. This finger blade is pivotally secured at its upper end by a pin 313 to the plate 310. The pin 307 is provided with a screw driver head to permit it to be adjusted to receive the stroke of the lever 306 due to the reverse rotary movement of the worm by its toothed segment, as will be hereinafter explained.

The worms are each provided with a square axial aperture in which a square shaft 314 fits loosely, and the head block and their worms are arranged in alinement on the overhead arm and the square shaft 314 extends across and through and beyond both worms. Consequently the worms of both head blocks are rotated in unison, and the levers 306 engage both pins 307 at the same time and swing the lower ends of the finger blades out from the plates at the same time. The finger blades are returned into their slots on the backward stroke of the levers 306 by an expansive spring 315 which is mounted on a pin 316 that extends loosely through an aperture formed through the finger blade and is threaded into the plate 310.

The shaft 314 and the worms are rotated by a train of gearing in the following manner:

The pinion 300 on the upper end of the left hand solid shaft 286 meshes with one end of a rack bar 317, the opposite end of which meshes with a pinion 318 that is secured on the end of a shaft 319, the opposite end of which is provided with a bevel gear 320 that meshes with the bevel gear 321 on the end of the shaft 314. Thus the cam 293 through the lever arms 299 and 298 and left hand rack bar 296, imparts movement to the left hand solid shaft through its pinion 294, and the gear 300 on the upper end of this shaft operates the rack bar 317 which operates the gear 318, the lower end of whose shaft carries the gear 320 which operates the bevel gear 321 on the shaft 314, whereby the worms 303 are turned in unison, and the arms 306 thereby moved against the pins 307 to swing the plates 312 outward.

The plate 310 of each head block has a vertical reciprocal movement imparted to it of about a half inch stroke, which movement is effected in the following manner: A link 322 is pivotally secured at one end to each plate 310 by a pin 323 that extends loosely through an aperture in the finger blade and is threaded into the plate, and the opposite end of this link is pivotally connected at one end to a link 324, the opposite end of which fits loosely on a square shaft 325, that is mounted in sleeve bearings 326 rotatably journaled in bearings 327 that are formed on the head block (see Fig. 25). The square shaft 325 is rounded at its rear end and extends through a bearing 328 on the transverse portion of the overhead arm 253, and a bevel gear 329 is secured to this end and the shaft is partially rotated or oscillated by a train of gearing in the following manner: The pinion 302 on the upper end of the right hand solid shaft 286 meshes with one end of a rack bar 330, the opposite end of which meshes with a pinion 331 that is secured on the end of a shaft 332, the opposite end of which is provided with a bevel gear 333 that meshes with the bevel gear 329 on the adjacent end of the shaft 325. Thus the movement of the right hand cam 293 is imparted to the shaft 325 in the same manner described in connection with the left hand cam 293, and the shaft 214, the mechanisms operating these two shafts being duplicates of each other, and located on opposite sides of the machine.

After the head blocks B and C have dropped down at a short distance behind the box, the head block B is moved forward by the pinion 275 and rack bar 269 and as its push block 11 advances to the box, the upwardly beveled bottom surface of its finger block 9 engages the up-standing edge of the blank and bends it inwardly over the top edge of the box to the same angle as the bottom of the finger. Then the box is engaged by the push block 11 and is moved forward against the abutment block 12 of the head block C and as the box moves toward that abutment block the rear end of the box and the up-standing edge of the blank are pushed against the beveled bottom surface of the finger block 9 of the head block C, and as the rear end of the box advances under this finger the up-standing edge of the blank is bent into the box down to the edge of the box, which is engaged by the base edges of both finger blocks when the box is finally gripped between the push and the abutting blocks of both heads. The finger blocks are then both raised upward vertically about a half of an inch by the movement of their links 322 and 323 and the square rod 325 and by the same means are then moved straight down until the heels of these finger blocks rest directly on top of the end edges of the box, when pressure enough is applied to them through the links to firmly seat the box against the top of the table, and both finger blocks are then raised and remain up while the side turn in mechanisms advance and turn over and in and against the inside surfaces of the box the upwardly projecting side edges of the blank.

These mechanisms that turn in the opposite side edges of the blank into the box are constructed, arranged and operate as follows:

To the top of the table on opposite sides of its longitudinal center and at equal distances from it, we secure two head blocks 334, which support the side turn in mechanisms. The side turn in mechanisms of these two head blocks face each other and as they are exactly alike a description of one will suffice for both.

Each head block consists of a base portion 335 that is slidably mounted to be moved in a horizontal plane in a transverse slideway 336 formed in the table, and a vertically movable chuck block 337 that is vertically adjustable upon upwardly projecting standards 338 that are formed on the base 335. The standards are yoke shaped and are provided with guide ways and each chuck block is provided with a capped lug portion 339 that is slidably mounted in the guideway of the standard. A threaded rod 340 is rotatably mounted at its upper end in a bushing 341 at the top of the standard and threads down through the lug 339 of the chuck block, its lower end resting in a bearing 342 in the adjacent end of the base 335. The threaded rod is adapted to receive a wrench to turn it to raise or lower the chuck block which has a vertical movement on the standard sufficient to allow it to be adjusted to all heights or depths of boxes the machine will wrap. This chuck block extends down through a slot in the table, when adjusted for boxes of slight depth, and it is adjustably movable up and down to accommodate boxes of different depths, and is fixed in adjusted positions by its cap 343 which can be clamped tightly to the standards. The chucks face the opposite sides of the box that is to be wrapped (see Figs. 11 and 14), and the opposing side members of each chuck are each provided with a semi-circular slideway 344, and in each pair of slideways is mounted a segmental block 345, which therefore travels in a semi-circular path and is moved in this path by a combination of link and lever members, which are constructed and act as follows:

The segment block is of the form shown in Figs. 16 and 17, and is provided with a depending lug 346, to which one end of a link 347 is pivoted. The lower end of this link is provided with an oblong slot and is pivotally connected through this slot by a pin 348 to the upper end of a vertically reciprocable bar 349, which is slidably mounted in a guide 350 that is formed on a depending portion of the head block.

The lower portion of each of the bars 349 is provided with an adjustable collar 351 that rests on a spring 352 that is housed to a socket 353 that is attached to the cross bar 354, which cross bar is given a vertical reciprocating movement by a forked lever 355, to which it is bolted, and which is operated by a cam 356, which is secured upon the main driving shaft 17. The upper end of the forked lever 355 moves in a guideway of a standard 35ᴬ, which is bolted to the bed plate. The upper portions of the bars 349 are square, but the lower portions thereof are rounded and extend through the springs 352 and sockets 353 to allow for vertical adjustments to correspond with adjustments of the head blocks to fit boxes of different heights.

Each bar 349 has a rib portion 357 that has a cam curve 358 at its upper end, that engages a roller 359 that is mounted on the depending member 360 of a rock arm. This rock arm comprises a long hub that is pivotally mounted on a pin 361 that extends through it and the sides of the chuck, the depending member 360 and two arms 362 spaced a short distance apart and extending upward, the end of each of which terminates in a fork 363 in which lie rollers 364 which are mounted on opposite sides of a hub portion on one end of a sliding block 365, which is reciprocally mounted in a slideway 366 formed in the top of the segment block 345. Arms 367 project from the opposite ends of the hub, the outer ends of which are connected to the lower ends of springs 368 that act to normally hold the rollers 359 in contact with the ribs 357 of the bars 349. The opposite ends of the springs are connected to pins 370 that are secured to the sides of the chuck. The sliding block is provided with a cap 371 that is arranged to clamp a side turn in blade 372, as shown by Figs. 12, 13 and 14. The side turn in blades are of a length corresponding to the inside length of the boxes being covered.

Along the front face of each chuck we secure a bar 373, against which the upper edges of the sides of the boxes bear, when the turn in blades bend the extended portions of the sides of the blank over against the inner faces of the sides of the box, as shown by the dotted lines in Fig. 14.

These two chuck heads and their bases are arranged to be moved in unison together toward or away from the longitudinal center of the machine in the following manner:

Each head block is formed with an opening in which is secured an internally threaded bushing 374, in which is screwed a plug 375, having a square hole, the outer end of the plug having an annular groove 376. Through these plugs passes a square rod 377, the ends of which are rounded and enter bushings in the sides of the table. The threaded rod 226 extends parallel with and adjacent to the square rod 377, and upon the end portions of the threaded rod are screwed followers 378, comprising hub members having arms, the outer ends of which are bifurcated, and straddle the angularly grooved ends of the plugs 375. Thus by turning the crank handle 227 on the end of the threaded rod 226, the said rod is rotated, and the head blocks are moved inward or outward, in their slideways 336.

The object of threading the plugs 375 to the bushings 374 is as follows: When the boxes pass from the first into the second stage position, the head blocks stand in such positions relatively to each other that the boxes may pass readily between the bars 373 without touching them, but after they have reached their proper position, it is necessary that their sides should be engaged by the said bars 373, and to accomplish this a slight inward movement is given to each head block, by turning the square rod by which the plugs 375 are turned, and as the plugs when turned by the square rod are held against lateral movement by the followers 378, the head blocks are thereby moved in or out according to the direction of rotation of the plugs. The square rod is turned in the following manner: The cam disk 248 has a cam 379 which engages a roller on one member 380 of a double crank arm, which is supported in a bracket 381 that is bolted to the bed plate of the machine. The other arm 382 connects with the lower end of a connecting rod 383, the upper end of which is pivotally attached to a lever 384, which is mounted on the adjacent end of the square shaft. It will thus be seen that the cam 248 imparts movement to the connecting rod 383, by which the lever 384 is rocked and the shaft turned.

The chucks having been adjusted with their guide strips in operative relation to receive a box and blank between them, the segment block and the sliding block operate to cause the side turn in blade 372 to turn in the upwardly projecting side edges of the blank into the interior and against the inside surfaces of the box in the following manner:

When the bars 349 are raised by the cam 356 the cam curve 358 at the upper end of the bars first engages the rollers 359 of the rock arm, which causes the lower ends of the rock arms to swing out and their upper end to push the sliding blocks 365 forward toward the box, which causes the side turn in blades to move horizontally forward and engage the projecting edges of the blank, and in moving forward they barely clear the top side edges of the box; then as they reach the end of their inward stroke the pins 348 at the tops of the bars 349 have by this time moved up with the bars to the upper end of the slots in the links 347, which connect the bars with the segment blocks 345 and thus lift the segment blocks, causing them to move in an arc of a quarter of a circle in the semi-circular curved slideways of the chucks, which causes the sliding blocks and the turn in blades to tilt upward into vertical positions, and as the blades tilt over the side edges of the box they bend the edges of the blank over into the box and against its inside surfaces and the blades press the blank tightly against the inside surfaces of the box when it swings into a full and a trifle more than a full vertical position, which brings a decided side pressure of the blades 372 against the inside of the box, thus firmly pressing the edge of the blank against the inside surface of the box, the turning in blades thus rolling over the edge of the box and pressing flat against its inside surface, the sides of the box with the turned in blank being pressed between the said blades and the bars 373.

When the segment blocks move upward in their curved slideways 344 in the chucks, they lift the rollers 364 of the sliding block 365 out of the yoke ends 363 of the arm 362 and swing them up into such a vertical position as is necessary to cause the finger blade to press the edge of the blank against the inside surface of the box.

When the side turn in blades 372 have been moved against the inside of the box with the full pressure of their links 347, their cam and rod and link operating mechanism hold them there long enough to allow the blank edge turning in end fingers to complete their blank turning in action. This they now do by the rotary action of the worms 303, which now act through their cam and lever and gearing actuating mechanism to move the toothed segments 304, which consequently rock the levers 306 to engage the pins 307, by which the plates 312 with their end turn in blocks 9 are swung outward or toward each other, and instantly thereafter, the rod 325 is partially rotated, in the manner previously described, and the members 310 with the plates 312 are depressed through the medium of the links 322, and levers 324, and the blocks 9 pass down into the box, the ends of which pass between the turn in blocks 9, and the abutment blocks 11 and 12 respectively, whereby the ends of the blank are folded down against the inside surfaces of the ends of the box.

Consequently the end turn in blocks on this their second downward movement complete the end turning in operation of the edges of the blank.

These end turn in blocks are so formed that they fit down into the box between the side turn in blades and press the corners of the blanks down smoothly into the corners of the box. The end blocks then first move up out of the box and then the side blades are swung to a horizontal position by the downward movement of the bars 349, and the links 347, and the rollers 364 of the sliding block 365 are swung down into the forks of the rock arm, and when the curved cams 358 of the bars pass below the said rollers the contraction springs 368 swing the rock arms backward, which movement draws the sliding block and the side turn in blades back out of the path of the box, which is now wrapped as far as the action of the second stage mechanism of the wrapping machine will wrap it, and it is now ready to be transferred from this station to the third stage treatment station. A stop pin $a^2$ extends through the rear end of the plate 365, and into a recess $a^3$ in the rear end of the segmental block 345, and prevents dropping of the plate in its slideway in the block, when the block has been moved to the position shown in dotted lines, Fig. 14, in which the plate 365 stands vertical. The blades 372 however are not withdrawn from contact with the edges of the sides of the box, until after the box has been engaged by the grippers 216.

The ends and sides of the top edges of the blank have now been completely wrapped and glued against the interior surfaces of the box, and are completed, and the head blocks have been raised up above the box by the upward vertical movement of the overhead arm 253. Then the second stage box gripping and transferring clips 216 and their operating mechanism act by being moved rapidly from the third stage treatment station to the second stage treatment station, where the finger clips 216 grip the now almost completed box and transfer it to the third stage station, in the manner and by the mechanism previously described.

The third stage treatment of the now wrapped box consists of administering a finishing pinching pressure against the opposite ends and in the end corners of the box, and the mechanism which accomplishes this is adjustably mounted on the overhead arm 253 which has a vertical reciprocal movement that is timed to act to move the box end clamping mechanism down behind the front end of the box after it has been moved into the third stage station by the box transmission mechanism, which downward stroke of the overhead arm is the same stroke that moves the chuck heads of the second stage station down behind the ends of the box. The box treatment mechanisms of both the second and third stations are timed to act in unison, as relates to the reciprocal movement of the overhead arm.

The mechanism that applies the clamping pressure to the ends of the box in the third station comprises two head blocks E and F, each of which is slidably mounted on a slideway portion 385 formed on the under side of the overhead arm, each head block being provided with guideways 386 that are provided with caps 387. These two head blocks are adjustably mounted at box receiving distances apart on opposite sides of the vertical center of the station to fit boxes of different lengths, by a right and left handed threaded rod 388 which extends through a threaded aperture in each head block. At the center of the length of this threaded rod it is supported by a split journal box 389, which is provided with a clamping sleeve through which the rod rotatably passes, and a finger nut 390 is arranged to close the sleeve to grip the screw, a collar being pinned to the rod on each side of the sleeve to prevent endwise movement of the rod. This screw is also supported at its rear end by a lug 391 which is secured to the adjacent end of the arm 253 and the end of the screw is arranged to receive a crank lever 392, by which the operator may turn it to move the head blocks in positions to fit boxes of different lengths. Each of these head blocks has a hollow chamber opening up into it from its lower edge, and the box edge clamping mechanism is positioned in and depends from this opened chambered end. The mechanism for each head block is of the construction and arrangement following and it consists of an eccentric 393 formed on a shaft 394, which extends transversely across the block and is mounted in bearings formed in its opposite sides. The shaft 394 is rotated by a bevel gear 395 that is secured on one end of it, and which meshes with a bevel gear 396 having a hub which is mounted in a bearing on one side of the head block, the gear 396 being slidably mounted on a square shaft 397. This square shaft extends past both heads, and it is provided at its inner end with a bevel gear 398 that meshes with a bevel gear 399 that is secured on the lower end of a vertical shaft 400 that extends up through bearings 401 formed on a bracket 402 secured to the overhead arm 253. A spur gear 403 is secured on the upper end of the shaft 400, which meshes with the gear 301 that is mounted on the upper end of the right hand square tubular shaft 285, which extends down through one of the large tubular standards 259, the lower end of which carries one of the gears 287 which meshes with one of the straight rack bars 288, as previously described.

Two arms 404 are rotatably mounted on the eccentric 393 of the shaft and their ends are pivotally secured to lugs 405 that are formed on a plate 406 that is provided with guideways and is slidably mounted in slideways formed in the opposite sides of the head block. An abutment bar 407 which preferably consists of a piece of wood, is clamped to the outer end of the plate by a clamping cap 408. The abutment bar is arranged to fit snugly down inside of each box between its sides at its ends, and it has a short reciprocal movement against the inside surface of the adjacent end of the box due to the throw of the eccentric, which acts to press the bar against the inside surfaces of the wrapped ends of the blank that were glued to the box at the second station, but which need a pinching pressure to smoothly flatten them against the inside ends and corners of the box.

Upon the eccentric shaft at the side of the arms 404 two short levers 409 are mounted, the free ends of which are pivotally secured to the opposite sides of one end of a link 410. The opposite end of this link is secured to one of the ends of two pairs of links 411 and 412. The opposite ends of the links 411 are pivotally secured to a block 413 which is secured to a cross bar 414, which is bolted to the sides of the head block. The opposite ends of the other two links 412 are pivotally secured to lugs which are formed on a plate 415, that is bolted to a pressure bar 416, the front end of which is covered with a strip of felt. The pressure bar 416 and the felt strip are made wide enough to extend across the outside end of the greatest width boxes covered by the machine. This pressure bar has guideway side edges which fit in slideways 417 formed in the insides of the side pieces of the pressure plate 406. The toggle links 411 and 412 due to the partial rotative throw movement of the eccentric shaft impart a short reciprocal movement to the outside pressure bar 416, which is arranged and timed to move against the outside surface of the end of the box, and to oppose the pressure movement of the inside abutment bar 407 against the inside of the box. Both movements take place at the same time and pinch or clamp the ends of the box between them. The block 413 acts as an abutment for the toggle power pressure of the arms 411. When a box arrives at its proper stopping position of the third stage treatment station, the overhead arm is at the top of its upward stroke and consequently the head blocks are raised above the path of the incoming box. Both head blocks are positioned and timed so that when a box is transferred from the second station to the third station the presser bars will stand directly over the ends of the box, and these presser bars are spaced as far apart as the eccentric shaft will throw them, which would be preferably about a quarter of an inch.

Then when the overhead arm moves down, these bars straddle the opposite ends of the box at their upper edge portion. Then the cam and gearing mechanism that operates the eccentric shaft of the head blocks acts to cause the eccentric through the arms 404 to move the blocks 407 against the inside surface of the ends of the box, and through the toggles 411 and 412, link 410 and levers 409, to move the presser bar 416 against the outside surface of the box, and thus very tightly pinches the end edges and corners of the box between them.

The box has now been completely wrapped and its corners finished and it is ready to be released and discharged from the machine.

The presser bars then move apart to release the box by the action of the eccentric shaft. The overhead arm then raises the head blocks above the box, and it is engaged by the finger clip 239 and is moved off from the discharge end of the wrapping machine.

The mechanism that engages the box and discharges it from the third stage station and from the wrapping machine is a part of the same mechanism that moves the box from the second to the third stage station, and it consists of a single finger clip 239 that is pivotally secured to the flange 211 of the rack bar 205, as previously described.

When the first box fed into the machine reaches the third stage station, there will be a box in the first and second stations at the same time, and after that there will always be three boxes being fed through the machine and wrapped simultaneously.

At the first station the box wrapping treatment steps are operated by mechanism entirely independent of the mechanism that operates the second and third stage treatment stations.

The second stage treatment station is also operated by mechanism entirely independent of the mechanism that operates the first and third station treatments, and the third station treatment operating mechanism is independent of the first and second. They are all however coöperatively connected to the main driving shaft, and the cams are timed to effect their actions in such harmonious relation as will keep them all going in their proper successive box wrapping and feeding order as the blank and boxes feed into and through the machine.

A large worm gear 418 is secured to the main driving shaft, and a worm pinion 419 which is mounted on a power driven shaft 420 that is rotatably journaled in the frame at right angles to the main driving shaft 17, drives the worm gear and the main driving shaft. This power driven shaft extends through and beyond one side of the frame and a power driven clutch pulley, not shown, is secured to it, which pulley is adapted to be connected by a belt to a source of rotative power, while the clutch part of the pulley is arranged to be thrown in or out to start or stop the machine as the operator desires.

The gummed blanks are transferred from a gumming machine to a suction device that may be attached to the wrapping machine as shown in our pending application hereinbefore referred to, but that is operated by the gumming machine, such as a blank transmitting and suction gripping device being illustrated in our pending patent application Serial Number 30,471 filed May 25th 1915.

Our present invention however, contemplates the use of any gummed blanks transmission device that will transmit the gummed blanks one at a time from a gumming machine to the top of the lower plunger of our box wrapping machine.

We preferably however, employ the apparatus illustrated herein, which consists of the following instrumentalities:

On the top of the side wiper supporting bracket we secure two small brackets 460. These small brackets each support a barrel plunger 461 and plunger barrel 462, in which an expansive spring 463 is housed, as follows: The barrel 462 is hollow from its top end to its lower end portion, and a plug 464 is threaded in its top end. The lower ends of each of these barrels is provided with threaded stem extensions 465, which are threaded into and through the upper ends of the brackets, and a check or jam nut 466 is threaded on each stem and is tightened against the top of each bracket, which rigidly secures each plunger barrel to the top of its respective bracket. The threaded stem 465 of the plunger barrel is provided with an axial aperture throughout its length into the interior chamber of the barrel, and the plunger 461 is reciprocally mounted in it, the upper end of which is provided with a head 467 that fits loosely in the chamber of the barrel, and the expansive coiled spring 463 is mounted in the barrel, the lower end of which bears against the top of the head of the plunger and its upper end bears with a resilient expansive pressure against the lower end of the threaded plug in the top of the barrel. The lower ends of each of these plungers are pointed so as to enable them to tightly pinch the paper blanks, and thus hold them tightly and firmly when the table portion 468 of the gumming machine is withdrawn away from the box wrapping machine. This table 468 is the only feature or part of the gumming machine we represent, as it does not form any part of our present invention. It reciprocates back and forth and delivers the gummed blanks to these resilient plunger points, and it forms a part of the pending application Serial No. 30,471 above mentioned.

Below each of these plunger points a disk 469 is positioned. These disks have a vertical reciprocating movement to and from these plunger points that engages them and lifts them up against their expansive springs after a blank has been fed between them, as will be presently described. Each of these disks is provided with an air suction inlet aperture 470 which is positioned in each disk to one side of that part of it the plunger points bear against. These air suction apertures are adapted to grip the blanks with an air suction force jointly with the plunger points and to continue to hold the blanks by air suction force after they have moved away from the plunger points. Each of these disks is secured to the end of an air tube 471, both of which register with the air inlet apertures in the disks. These tubes are united into a single tube, the free end of which is connected to a hose 472 that leads to an air pump which we do not illustrate, as it preferably is not mounted on our box wrapping machine, but is preferably mounted on our blank gumming machine above referred to, and is operatively connected to these tubes and operated by any suitable means.

Our present invention, however, contemplates any means of producing an air suction force in these tubes, and in the apertures 470 of the disks, and means for timing the action of the suction force to grip the blanks in unison with the operative movements of the lower and upper plungers in gripping the gummed blanks. These air suction blank gripping disks are formed on a cross bar 473, having an extension which is provided with a long slot 474, by which the extension is secured to the upper end of a vertical bar 475 that extends down through a slot 476 in the cross head 45, through a guide aperture formed in the bracket 41, and through a slot formed in the table, a spring 477 being mounted on it between the under side of the table and a collar 478 which is secured to the bar, the spring causing it to bear with a resilient pressure against the upper edge of a horizontally positioned cross bar 479 that forms a head across a vertical bar 480 that is reciprocally mounted in a slideway 481 formed in the cross frame 59 that is secured to the opposite sides of the box frame of the machine.

The lower end of the reciprocating bar and its head cross bar which we will term a T-shaped reciprocating bar, is connected at its lower end to one end of a link 482, the opposite end of which is connected to one end of a rock arm 483 that is pivotally connected intermediate of its ends to the cross frame 59. The opposite end of this rock arm is provided with a roller 484 which engages a cam 485 that is formed on the cam disk 16, which is mounted on the main driving shaft 17 of the box wrapping machine. The cam and rock arm impart a vertical movement to the T bar and vertical bar and the air suction inlet disks of about a quarter of an inch. The operation of these combined gummed blank gripping air suction inlet disks and plunger points is as follows:

When the lower plunger is in position to receive a gummed blank, the table 468 moves across over the top of it to the air suction disks, the adjacent edge of the table being provided with recesses that allow the edge of the table to partially surround the disks, which allows the air suction inlet apertures in the disks to stand underneath the adjacent edge of the blank as it is fed forward to them.

Instantly after the blank is delivered over the air inlet apertures, the air suction disks start on the upward stroke of their reciprocal movement, and as they do the air suction force of the air inlet apertures grips the under side of the blank and lifts its edge off from and slightly above the edge of the table; the air suction disks then continue their upward movement and press the blank against the pointed ends of the plungers and continuing upward lift these plungers against the resilient pressure of their springs, which pressure pinches the blank against the disks, and they exert a positive holding grip on the blank, while the table is moving backward on the return stroke of its reciprocal movement. Consequently both the air suction force and the plunger points are gripping the blank, while the table moves back out of the operative movements of the plungers, and the blank's side and end wipers of the box wrapping machine. This double gripping force on the blank is deemed necessary as the blanks as they lie on the table cling slightly to it at times, and we have provided positive and reliable mechanism that always holds them tightly. The instant the table has withdrawn from under the blank, the blank settles down on top of the lower plunger, and the disks then commence the downward stroke of their reciprocal movement, and they move away from the plungers and release the blank from them as they still hold the blank by air suction force, and they retain this suction force until they have moved to the end of their downward stroke, and the upper plunger with a box on it has moved down against the gummed surface of the blank, which is held by these disks properly centered and positioned on the top of the lower plunger to receive the bottom of the box on its central body portion.

Our invention contemplates the use of any operative box feeding device or mechanism. We preferably illustrate however, the following mechanism for feeding the boxes to the upper plunger of our box wrapping machine.

Upon the main shaft 17 we secure a cam 421, having a groove in which lies a roller that is mounted on a yoke or fork end 422, which is bolted to the lower end of a lever 423. The fork end 422 straddles the main shaft 17 and the upper end of the lever 423 is secured by a bolt 424 to a projection 425 adjacent to the lower end of a lever 426. The lower end of this lever is pivotally secured upon a stud secured to a bracket 427, which is bolted to the table. The upper end of this lever is pivotally connected to one end of a link 428, the opposite end of which is pivotally attached to a depending lug 429, that is secured to a slide bar 430 that is reciprocally mounted in a slideway 431 that is formed in a ribbed bar 432 that extends at right angles to the longitudinal axis of the box wrapping machine and from its upper and lower plungers 8 and 6 respectively.

This ribbed bar is supported upon and secured to a cross bar 433 that is secured at one end to a bracket 434 that is bolted to the top of the table, and is supported by a bracket 435 at its other end, that is bolted to the yoke-shaped frame 33. The ribbed plate is provided with a slot 436 through which the lug 429 depends, and the slideway is formed partially in each of two opposite upwardly projecting ribs that extend along its length. An adjustable flanged push bar 437 is secured upon the top of the slide bar 430, by a bolt 348, which passes through a slot 439 in the push bar, and is screwed into the slide bar. To the forward end of the push bar 437, is secured a plate 440, the upper edge of which is backwardly curved, which permits an attendant to rapidly place the boxes with accuracy upon the slideway and against the said plate 440 without stripping the top edge of it. This box pusher works reciprocally to feed a box-shell, which means a stayed or unstayed cornered box in an unwrapped condition to the upper plunger of the box wrapping machine, at each cycle of its operative movement, as will be fully explained hereinafter.

This box pushing bar and its supporting bar are on a horizontal plane, and at right angles to and centrally of the length of the plungers 6 and 8.

The cross bar 433 supports at its opposite ends guide bars 441, each of which is integrally connected to a slide block 442, which is adjustably mounted on the said cross bar, by means of bolts 443, which pass through the said slide blocks and through slots 444 formed in the cross bars.

These guide bars 441 form the side gages for the boxes and they are adjustable to and from the longitudinal center of the slideway plate and its box pushing bar to fit boxes of varying widths. They are consequently adjusted to receive the size of boxes that are to be fed to the plunger loosely but snugly between them, and are then bolted in their adjusted positions. To facilitate the rapid and accurate placing of boxes one after the other by an attendant, the guide bars are each provided along their upper edges with a backwardly curved blade 445, which is secured to each guide bar by any suitable means. These guide bars and the slideway bar are positioned in such relation to the upper plunger that the reciprocating box pusher delivers them directly and centrally under the plunger, and a stop 446 is adjustably secured on the inner end of each guide bar against which the box is moved by the pusher bar. Each stop comprises a yoke-shaped member that straddles the top edge of the guide bar, and which present abutments which define the inward movement of the boxes relatively to the plungers.

The guide bars 441 are each formed with a horizontal ledge 447, which ledges are on the same plane as the upper face of the slideway bar 432, and form with the said slideway bar supporting means for the boxes, as will be clearly understood by reference to Fig. 68.

Our box feeding mechanism will feed either plain straight sided boxes, or extension edge boxes, and guide bars extend along the opposite ends of the plunger and guide the boxes centrally to it. The ledges 447 are only slightly longer than the width of the largest box for which the machine is set; and it is therefore necessary that means be provided for supporting the boxes in a position between the two plungers, and that such supports be capable of being automatically withdrawn, in order that the boxes may be carried down with the upper plunger, to pass between the side wipers; supports of this character being necessary in the case of extension edge boxes, where if pressure upon the boxes were required to spread the supports, the extended edges would thereby be broken.

To this end, we provide each of the guide bars 441 with two integral brackets 448, the upper ends of which are provided with bearings in which a shaft 449 is rotatively mounted. Each shaft extends beyond the end of the outer bearing and a coiled spring 450 is mounted on it, one end of which is secured to a collar that is secured to the end of the shaft, and the other is secured to the adjacent bearing. A lever 451 is mounted on and is secured to each shaft 449 between its bearings, and its opposite end is adjustably secured to the slotted end of a slotted bar 452 by a clamping bolt 453.

Each slotted bar is provided at its inner end with a roller 454 which when the plunger 8 is at the limit of its upper stroke bear against its adjacent ends, and the slot allows for adjustment of the bar relative to the plunger as will be presently described.

To the opposite end portions of the shafts 449 inside the bearings 448, levers 455 are secured, the lower ends of which are pivotally secured to one of the ends of a pair of links 456, the opposite ends of which are pivotally secured to opposite ends of blades 457, which are reciprocally supported in slots 458 formed through each of the guide bars 441. The rollers 454 bear on opposite ends of the plunger 8 when it is at the limit of its up stroke, and the said rollers are automatically held against the ends of the plunger by the tension of the springs 450. A cam blade 459 is secured on top of and at each end of the upper plunger, and the springs 450 are arranged to exert a tension on the shaft that turns it to cause the rollers of the bar to bear with a resilient pressure against the opposite ends of the plunger, and as long as the rollers are on the plunger the blades are held inward beneath the bottom of the box, and thus support the said boxes. As the plunger moves down it enters the box and when it gets within about a quarter of an inch of its inside bottom surface, the rollers 454 on the bars 452 ride onto the backwardly curved cam blades 459, which allows the springs to turn the shaft to draw the blades 457 back away from under the bottom of the boxes and instantly afterward the plunger reaches the inside surface of the bottom of the box and carries it down against the blank and against the lower plunger.

The operation is as follows:

An attendant places the uncovered boxes one at a time on the supports formed by the ledges 447 and the slideway bar, between the side blades 445 and the guide bars 441, and in front of and against the box pushing blade 440. Then the reciprocating box pusher blade, which is timed by the cam and lever mechanism, moves each box under the upper plunger 8 of the first stage treatment station of the box wrapping machine, just as it reaches the limit of the upper stroke of its vertical reciprocating movement, and the stops 446 stop each box in its proper position for the upper plunger to enter it when it starts on its down stroke, which it does, and carries it down against the gummed blank and the top of the lower plunger.

The operation of our multiple stage wrapping machine is as follows:

The blanks properly gummed and tempered are fed automatically one at a time into the left hand side of the machine when the operator faces the first stage treatment station, and directly and centrally of their area on top of the lower plunger, which at the instant the blank is fed into the machine has moved up above the side and end wipers to receive it.

The transmission device 169 transmits the box from the first to the second station of the machine and the boxes are fed automatically into the right hand side of the machine and positioned directly and centrally above the blank over the top of the lower plunger, which is fed into the machine slightly before or simultaneously with the feeding in of the box, the gummed side of the blanks facing upward toward the bottom of the box.

The box is stopped but a short distance above the blank. The upper plunger then moves down into the box and carries it down until the bottom of the box rests against the gummed top surface of the blank and against the lower plunger, which offers sufficient pressure to it to allow the upper plunger to firmly press the bottom of the box against the gummed blank and glue it evenly and tightly to the bottom of the box. The resilient connection between the actuating rock arm and the plunger permits the upper plunger to press against the top of the lower plunger with a cushioning and yielding pressure.

The two plungers then move down between the side wipers and the resilient pressure of the upper plunger against the lower keeps the box and blank correctly supported relative to each other and tightly gripped between them, and as the plunger feeds the blank and box down between the side wipers, which have moved into blank engaging and wrapping position, they engage the flattened out sides of the blank with their rounded upper edges and as the box moves down between them the gummed sides of the blank are folded up and pressed against the sides of the box and evenly and smoothly glued there.

The side wipers exert a resiliently yielding pressure against the sides of the box through its resiliently yielding joint connecting with the rod to permit of any desired adjusted pressure to be applied to the opposite sides of the box, and when the plungers have fed the box down to the limit of their downward movement, the box has been fed through the side wipers and the sides of the blank have been glued against the sides of the box with the exception of a narrow top edge which is left standing vertically upward. The side wipers remain in contact with the opposite sides of the box, until the side and end wiping operation has been accomplished. The box is held by the plungers at the bottom of their downward movement until the corner wipers engage the corners of the blank, and fold them around and against the corner and end edge portions of the box, these corner wrappers being of about a half inch wide on the opposite four corner end portions of the box. The corner wipers when performing their functions are moved up to the corners, then tilted against them and forced to bear against them with a resilient cushioning and yielding pressure, and they are tilted away from the ends of the box and moved back out of the path of the end wiper, which acts next.

The box is still held at the bottom of their downward stroke, and these end wipers then are tilted against the ends of the blank, and as they move upward they carry the ends of the blank against and glue it against the ends of the box, folding the ends over the corners of the blank that were previously glued to corners and corner edges of the ends of the box. These wipers travel to the top of the box and are then tilted away from its opposite ends. The upper plunger is then raised, but the box stripper of the upper plunger which has been locked by the spring slide 159 remains against the bottom of the box until the top plunger is fully up out of the box, when its cam 161 frees the box stripper and it is shot upward by its contraction spring. The box is then released and the transmission plunger engages it and transmits it against the second stage station stop arm.

When the partially wrapped box arrives at the second stage treatment station, the overhead arm moves the blocks B and C down upon it and it is first positioned and then seated against the top of the table. Then its end turn in blocks first turn the ends of the blank in to stand at a slight upward angle of about 20 degrees, and leave them there and move up away from them. Then the opposite side turn in blocks move in and the side of the blank as it is turned over the side edges of the box engages the partially turned in corner edges of the ends of the blank and folds them down underneath the sides of the blank, which are pressingly glued against the inside surface of the box at one continuous movement of operation, which is the final treatment the sides of the top edges against the sides of the box get.

The end turn in mechanism then opens to straddle the end edges of the box and carries the end of the blank down into the box and glues the ends against its inside end surfaces. All of the turn in members are then raised up by the overhead arm, which releases the box and it is transferred to the third stage treatment station by the second station's box gripping and transmission mechanism, which moves it into operative relation to the end pressure blocks. These end pressure bars and blocks are lowered by the over-head arm and they straddle the edges of the box and through the medium of the eccentric and toggle actuated abutment and pressure bars they pinch the ends and end corners of the blank and box with a pressure of sufficient force to completely flatten and smooth out the end corners of the box, leaving the box with sharp smooth corners and ends.

The over-head arm then raises the pressure bars and blocks above the box and it is ejected from the machine by the ejecting finger.

We have provided by this multiple stage arrangement of the various wrapping treatments, a box wrapping machine of very large capacity, the mechanism of each station of which is simple, positive in action, and of durable and reliable construction, and while we have illustrated and described the preferred construction and arrangement of the same, we do not wish to be limited to the many various arrangements illustrated and described, as many changes might be made without departing from the spirit of our invention.

Having described our invention, what we claim as new and desire to secure by Letters Patent, is:

1. In a multiple stage box wrapping machine, the combination of the table frame, the vertical blank and box supporting plungers, and the side, corner and end wipers, with a horizontally reciprocating member arranged to engage the partially wrapped box at the first stage treatment station and transmit it to the second stage treatment station, said plungers being provided with a variable stroke for transmitting boxes of different lengths, and means for reciprocating said plungers.

2. In a multiple stage box wrapping machine, the combination of the table frame, the vertical blank and box supporting plungers, and the side, corner and end wipers, with a horizontally reciprocating member arranged to engage the partially wrapped box at the first stage treatment station and transmit it to the second stage treatment station, said plungers being provided with a variable stroke for transmitting boxes of different lengths, means for reciprocating said plungers, said means including cam actuated members mounted on said table frame.

3. In a multiple stage box wrapping machine, the combination of the table frame, the vertical blank and box supporting plungers, and the side, corner and end wipers, with a horizontally reciprocating member arranged to engage the partially wrapped box at the first stage treatment station and transmit it to the second stage treatment station, said plungers being provided with a variable stroke for transmitting boxes of different lengths, means for reciprocating said plungers, said means including cam actuated members mounted on said table frame, and a stop arm arranged at the second stage treatment station to stop said box, and means for separating said wrapped box gripping plungers to release said box to the transmission action of said box transmitting plungers.

4. In a box wrapping machine, the combination of the frame and the first stage box wrapping machine, with the second stage wrapping mechanism comprising means including box engaging and positioning mechanism adapted to engage said box and move it from its stop arm to its treatment position in the center of said station, and means including vertically reciprocating box end edge engaging members for clamping said box in its treatment position to said table.

5. In a box wrapping machine, the combination of the frame and the first stage box wrapping machine, with the second stage wrapping mechanism comprising means including box engaging and positioning mechanism adapted to engage said box and move it from its stop arm to its treatment position in the center of said station, means including vertically reciprocating box end edge engaging members for clamping said box in its treatment position to said table, and means including upwardly beveled wipers to engage and partially wrap the box ends of said blanks to stand inwardly over the end edges of the box into its interior.

6. In a box wrapping machine, the combination with the table frame and the plungers, of means including a reciprocating gummed blank supporting member for feeding a gummed blank centrally over said plunger, and means including air suction gripping disks and resiliently yielding points for gripping said blank when fed over said plunger and operatively holding it until engaged in box wrapping relation by said plungers.

7. In a box wrapping machine, the combination with the table frame and the plungers, of means including a reciprocating gummed blank supporting member for feeding a gummed blank centrally over said plunger. means including air suction gripping disks and resiliently yielding points for gripping said blank when fed over said plungers and operatively holding it until engaged in box wrapping relation by said plungers, and means including an air pump and cam actuated mechanism for operating the same and for creating an air suction force at the blank engaging surfaces of said disks, and means for reciprocating said gripping disks toward and away from said yielding points and then to release said blank.

8. In a box wrapping machine the combination of the table frame and the plungers, of means for feeding a gummed blank into operative box wrapping relation between said plunger, the reciprocating air suction blank engaging disks and the resiliently yielding blank pinching points arranged to jointly grip and hold and to release said blank at predetermined times in the reciprocal movement of said air suction disks.

9. In a box wrapping machine, the combination of the table frame and the plungers, with the blank gripping air suction disks, means including cam actuated mechanism for reciprocating said disks, means including air inlet apertures in said disks and an air pump operatively connected to the same for producing an air suction blank gripping force in said disks, and the resiliently yielding points arranged to be engaged by said disks and to assist them in holding said blank at a predetermined part of said disks' reciprocal movement.

10. In a box wrapping machine, the combination with the table frame and the lower plunger, and means including a reciprocating table for moving a gummed blank centrally over said lower plunger, of reciprocating air suction disks mounted on said frame and arranged to grip said blank and resiliently yielding points positioned in the reciprocal path of said air suction disk and arranged to also engage and hold to said blank during the upper part of the reciprocal stroke of said air suction disks and to release said blank during the lower part of their downward stroke, and means including air inlet apertures in said disk and an operative air pump for creating an air suction blank gripping force in said blank gripping disks.

11. In a box wrapping machine, the combination with the table frame and the box gripping plungers, of the blank pinching plunger points, the plunger point supporting barrels, the barrel supporting brackets secured to the adjustable side wiper bracket, said plunger points being reciprocally and resiliently mounted in said barrel, and means for securing said barrels to said brackets.

12. In a box wrapping machine, the combination with the table frame and the plungers, of air inlet air suction blank gripping disks reciprocally mounted at one side of said plungers, means for adjustably moving said disks to and from the centers of said plungers, and means including air suction operating inlet apertures in said disks.

13. In a box wrapping machine, the combination with side and end wrapping means, side and end turn-in means, and end finishing means arranged at separated stations, and blank and box supporting means at the first station, of means for conveying partially wrapped boxes from the first to the second station, and means for conveying boxes from the second to the third station and from the third station to a point of discharge simultaneously.

14. In a box wrapping machine, the combination with side and end wrapping means, side and end turn-in means and end finishing means arranged in successive stations, of reciprocating means for conveying a partially wrapped box from the first to the second station, and reciprocating means for conveying boxes from the second to the third station and from the third station to a point of discharge simultaneously.

15. In a box wrapping machine, the combination with side and end wrapping mechanism, side and end turn-in mechanism, and end finishing mechanism arranged in successive stations, of a power driven shaft in said machine and means operated by said shaft for actuating said mechanisms, reciprocating means for conveying boxes from the first to the second station, and reciprocating means for conveying boxes from the second to the third station and from the third station to a point of discharge simultaneously.

16. In a box wrapping machine, the combination with side and end wrapping mechanism, side and end turn-in mechanism and end finishing mechanism arranged in successive stations, of box and blank receiving and supporting means at the first station, means for feeding blanks to the blank receiving means, a reciprocating piston for moving boxes from the first to the second station, and a reciprocating bar having box-engaging fingers for moving boxes from the second to the third station and thence to a point of discharge simultaneously.

17. In a box wrapping machine, the combination with side and end wrapping mechanisms, side and end turn-in mechanisms, and end finishing mechanisms arranged at successive stations, of means for feeding assembled boxes and blanks to the first station and supporting them during the wrapping action, a gear operated rack bar for conveying partially wrapped boxes from the first to the second station, and a reciprocating conveyer for transferring boxes from the second to the third station, and thence to a point of discharge simultaneously.

18. In a box wrapping machine, the combination with side and end wrapping mechanisms, side and end turn-in mechanisms, and end finishing mechanisms arranged at successive stations, of box and blank receiving plungers for delivering assembled blanks to the first station and for supporting them during the wrapping action, and means for feeding boxes and blanks respectively to said plungers, a reciprocating conveyer for transferring partially wrapped boxes from the first to the second stage, and a reciprocating conveyer for transferring boxes from the second to the third stage, and thence to a point of discharge simultaneously.

19. In a box wrapping machine, the combination with side and end wrapping mechanisms, side and end turn-in mechanisms, and end finishing mechanisms arranged at successive stations, of means for passing assembled boxes and blanks down between said side wrapping mechanisms of the first station and supporting them during the end wrapping action, a reciprocating conveyer for transferring the partially wrapped boxes from the first to the second station, means at the second station for holding said boxes during the side and end turn-in action and a reciprocating conveyer for transferring boxes from the second to the third stage and thence to a point of discharge simultaneously.

20. In a box wrapping machine, the combination with side and end wrapping mechanisms, of coöperating means for assembling boxes and blanks and passing them down between the side wrapping mechanisms and supporting them during the end wiping action, side and end turn-in mechanisms supported beyond said side and end wrapping mechanisms, means for transferring unfinished boxes from the former to the latter mechanisms, resiliently pressed bars for holding the boxes during the side and end turn-in action, end finishing mechanisms supported beyond the side and end turn-in mechanisms and means for transferring boxes from the side and end turn-in mechanisms to the end finishing mechanisms, and thence to a point of discharge simultaneously.

21. In a box wrapping machine, the combination with side and end wrappers, of coöperating box and blank receiving means for assembling boxes and blanks respectively and passing them down between the side wrappers and holding them during the action of the end wipers, reciprocating means for feeding boxes to a point below and in line with the box receiving means, reciprocating means for feeding blanks to the blank receiving means, means for discharging partially wrapped boxes from the side and end wrapping mechanisms, side and end turn-in mechanisms for receiving and completing the wrapping action, end clamping mechanisms and means for gripping and conveying boxes from the side and end turn-in mechanisms to the end clamping mechanisms.

22. In a box wrapping machine, the combination with side and end covering mechanisms, side and end turn-in mechanisms, and reciprocating means for conveying boxes from the former to the latter mechanisms, of supports, parallel bars on said supports for guiding the boxes, and means for moving said supports in unison to cause the bars to clamp the boxes during the action of the side and end turn-in mechanisms, and to release them at the conclusion of the operation.

23. In a box wrapping machine, mechanism for wrapping the sides and ends of boxes comprising adjustable standards, side wrappers slidably mounted in said standards and means for operating them, forms for receiving and moving an assembled box and blank down between said side wrappers, whereby portions of the blank are folded up against the box, reciprocating means on said standards for folding portions of the blank around the corners and against the ends of the blank, vertically reciprocating means for folding portions of the blank up against the ends of the box, and reciprocating means for moving said box away from said mechanism.

24. In a box wrapping machine, the combination with side and end wrapping means, of coöperating side and end turn-in means, comprising laterally adjustable supports and side turn-in means thereon, and a vertically reciprocating support having depending end turn-in means thereon, guide bars on said laterally adjustable supports, reciprocating means for conveying boxes from the side and end wrapping position to the side and end turn-in position between said bars, means for moving the said turn-in supports independently of their adjustable movement, thereby to clamp said bars against the boxes during the side and end turn-in operation and release them at the conclusion of the operation, and reciprocating means for moving boxes away from said mechanisms.

In testimony whereof we affix our signatures in presence of two witnesses.

MELVILLE E. PETERS.
GEORGE H. FATH.
ALBERT F. MILLER.

Witnesses:
G. SARGENT ELLIOTT,
ADELLA M. FOWLER.